United States Patent
Christiansen et al.

(10) Patent No.: US 7,298,503 B2
(45) Date of Patent: Nov. 20, 2007

(54) PARTITIONING OF PRINT JOBS FOR RASTER IMAGE PROCESSING

(75) Inventors: Robert D Christiansen, Boise, ID (US); Paul R Wissenbach, Boise, ID (US); Robert E Stevahn, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 793 days.

(21) Appl. No.: 10/322,021

(22) Filed: Dec. 17, 2002

(65) Prior Publication Data

US 2004/0114170 A1    Jun. 17, 2004

(51) Int. Cl.
*G06F 15/00* (2006.01)
*G06F 3/12* (2006.01)

(52) U.S. Cl. ...................... 358/1.13; 358/1.1
(58) Field of Classification Search ............... 358/1.15, 358/1.13, 1.16, 1.1, 1.18, 402, 448
See application file for complete search history.

(56) References Cited

U.S. PATENT DOCUMENTS

| | | | |
|---|---|---|---|
| 5,619,624 A | 4/1997 | Schoenzeit et al. | |
| 5,652,711 A | 7/1997 | Vennekens | |
| 5,859,711 A | 1/1999 | Barry et al. | |
| 5,923,013 A | 7/1999 | Suzuki et al. | |
| 5,926,188 A | 7/1999 | Kawamoto et al. | |
| 5,978,563 A | 11/1999 | Kawamoto et al. | |
| 6,327,050 B1 | 12/2001 | Motamed et al. | |
| 6,373,585 B1* | 4/2002 | Mastie et al. | 358/1.15 |
| 6,825,943 B1* | 11/2004 | Barry et al. | 358/1.15 |
| 2002/0060801 A1 | 5/2002 | Motamed et al. | |

FOREIGN PATENT DOCUMENTS

WO  WO 02/073390 A   9/2002
WO  WO 2073390 A2 *  9/2002

OTHER PUBLICATIONS

European Search Report for Application No. EP03257024. Report issued Dec. 13, 2005.

* cited by examiner

*Primary Examiner*—Gabriel I. Garcia

(57) ABSTRACT

Various systems and methods for raster image processing employing partitioning of print jobs are described herein. In one representative embodiment, a method is provided that comprises the steps of determining a page count for a print job expressed in a page description language and specifying a number of partitions of the print job. The method also includes the steps of assigning each of the partitions of the print job to one of a number of raster image processing (RIP) engines for raster image processing, and, re-aggregating a number of raster image processed partitions from the RIP engines into a raster image processed output file. Each of the raster image processed partitions is generated by raster image processing a corresponding one of the partitions with a respective one of the RIP engines.

40 Claims, 16 Drawing Sheets

PARTITIONING OF PRINT JOBS FOR RASTER IMAGE PROCESSING

BACKGROUND

In the printing field, raster image processing is performed on very large print jobs during the printing of very large documents. Specifically, a document may be embodied in one of a number of page description languages that must be converted into raster bits in order to drive a printing device to print the various pixels, etc., on a page. Raster image processing may be performed, for example, by Raster Image Processing (RIP) Engines. Unfortunately, for very large documents, RIP engines can take a very long time to perform the needed raster image processing before the document can be completely printed.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

DETAILED DESCRIPTION

Figure 1:
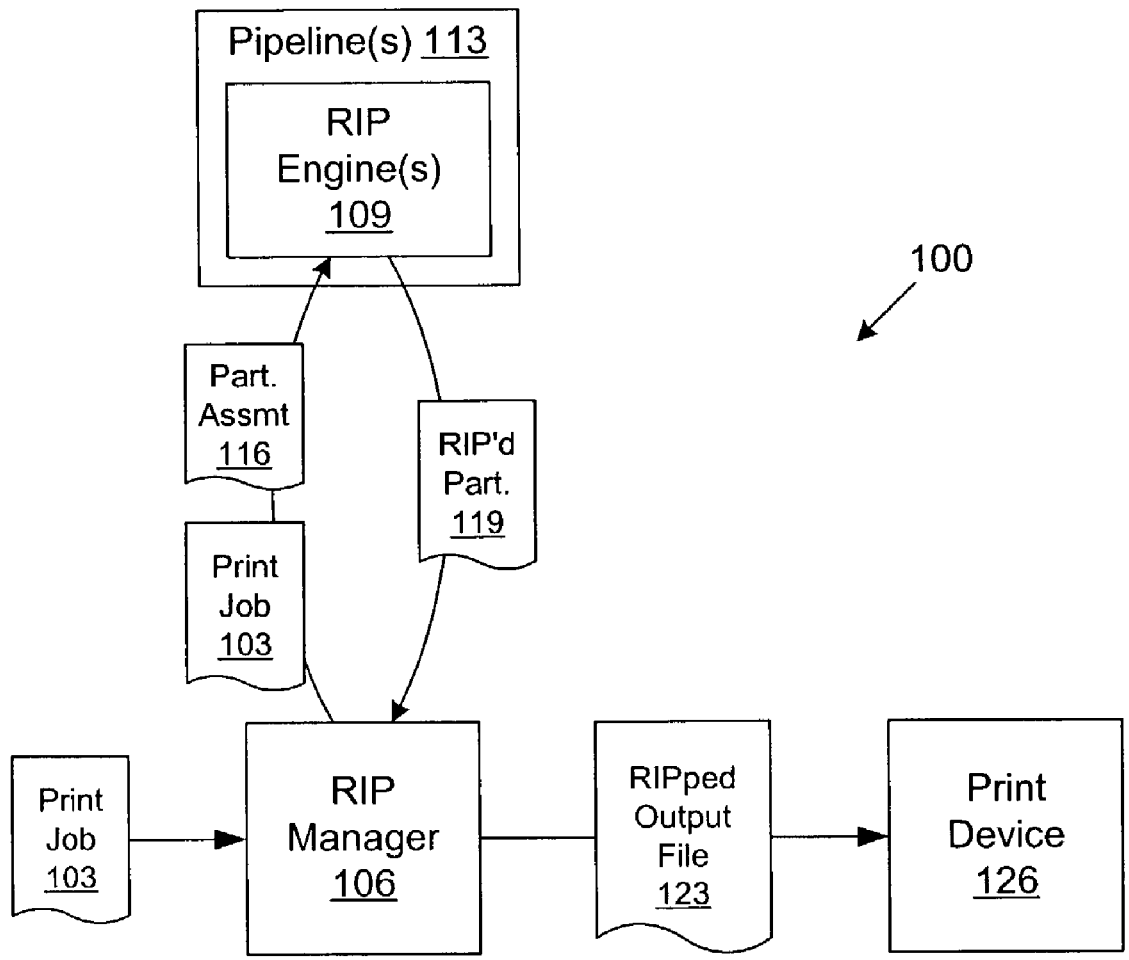
FIG. 1 is a block diagram that illustrates the raster image processing of a print job using partitioning of the print job.

With reference to FIG. 1, shown is a block diagram that illustrates an example of a raster image processing (RIPping) operation 100 of a print job 103 according to an embodiment of the present invention. In this respect, the block diagram of FIG. 1 provides an overview of the exemplary RIPping operation 100 that is described in further detail with reference to later figures that are described herein.

The print job 103 includes an embodiment of a document expressed in a page description language that is to be printed. To begin, the print job 103 is applied to a RIP manager 106. The RIP manager 106 first determines a page count that comprises the total number of pages of the print job 103. Assuming that the page count can be determined, then the RIP manager 106 determines a number of partitions of the print job 103 that are to be applied to RIP Engines 109 that are associated with a predefined pipeline 113. A partition is generally defined as a subset of the total number of pages in a print job that may be consecutive or nonconsecutive. Once the partitions are known, the RIP manager 106 creates a partition specification in a database or other data structure that is employed to track a status of the RIPping of each of the partitions. In this respect, a partition RIP status is maintained for each of the partitions in the partition specification. Initially, the partition RIP status for each of the partitions is set to be "unassigned" or equivalent value.

Thereafter, the RIP manager 106 then assigns partitions to one or more RIP engines 109 associated with a respective pipeline 113 for raster image processing. If no RIP engines 109 are currently associated with the respective pipeline 113 that is selected to RIP the print job, then the partitions and/or the print job is/are queued up to wait until at least one RIP engine 109 is assigned to the respective pipeline 113. In assigning each of the partitions to the RIP engines 109, the RIP manager 106 sends a partition assignment 116 to the respective RIP engines 109. The partition assignment 116 identifies a number of pages of the print job 103 that are to be RIPped by the respective RIP engine 109. When a partition has been assigned to a respective RIP engine 109, the partition RIP status associated with the respective partition is updated as "assigned" or equivalent value.

Once a RIP engine 109 receives a partition assignment 116 it determines whether it has a copy of the print job 103 in a memory local to the RIP engine 109 that is accessible by the RIP engine 109. If the print job 103 is not stored in the local memory, then the RIP engine 109 requests a copy of the print job 103 from the RIP manager 106. In response to the request, the RIP manager 106 transmits a copy of the print job 103 to the RIP engine 109. The RIP engine 109 then proceeds to RIP the partition of the print job 103 as specified by the partition assignment 116, thereby producing a RIPped partition 119. Thus, the RIPped partition 119 comprises a RIPped portion of the document embodied in the print job 103 that corresponds to the pages specified in the respective partition assignment 116. Once finished, the RIP engine 109 notifies the RIP manager 106 that the RIPping of the partition assigned thereto has been completed.

In response, the RIP manager 106 uploads the RIPped partition 119 and stores it in memory that is local to the RIP manager 106. Once the RIPped partition has been successfully uploaded in the memory local to the RIP manager 106, then the RIP manager 106 updates the partition RIP status to "completed" or equivalent value. The status is not updated as such until the RIPped partition 119 is successfully uploaded just in case a power outage occurs during the transfer, etc.

Once any one of the number of RIP engines 109 associated with a selected pipeline 113 has completed the RIPping of a respective partition, if there are further unassigned partitions that remain, the RIP manager 106 assigns the remaining partitions to the RIP engine 109 until all partitions have been RIPped accordingly. The print job 103 need only be downloaded to each of the RIP engines 109 once. That is to say, after the print job 103 is downloaded to a RIP engine 109 to RIP a first assigned partition, the print job 103 is then available in the local memory of the RIP engine 109 for RIPping of subsequently assigned partitions.

Once all of the partitions of a print job 103 have been RIPped and corresponding RIPped partitions 119 are stored in the memory local to the RIP manager 106, then the RIP manager 106 combines or re-aggregates the RIPped partitions 119 into a single RIPped output file 123. The RIPped output file 123 is then applied to a print device 126 for printing. The print device 126 may be any appropriate printer taking into account the size of the print job 103 and the printing capacity of a respective print device 126.

In addition, the RIP manager 106 includes a pipeline configuration system that allows a user to configure pipelines 113 by generating various user interfaces as will be discussed.

Figure 2:
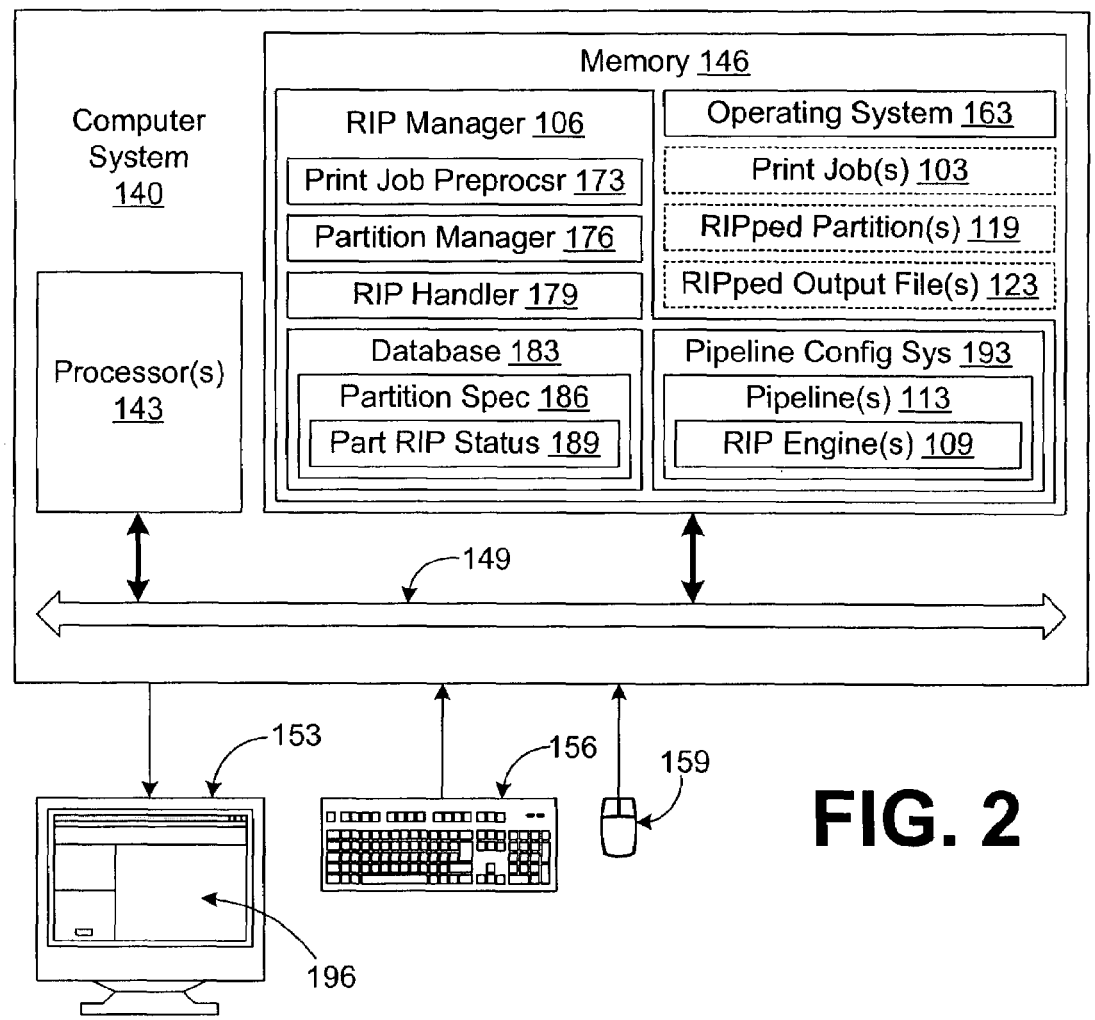
FIG. 2 is a schematic of a computer system that includes a raster image process (RIP) manager to accomplish the partitioning illustrated in FIG. 1.

With reference to FIG. 2, shown is a computer system 140 that is employed to execute the RIP manager 106 according to an embodiment of the present invention. The computer system 140 comprises a processor circuit having one or more processors 143 and one or more memories 146, both of which are coupled to a local interface 149. The local interface 149 may be, for example, a data bus with an accompanying control/address bus as can be appreciated by those with ordinary skill in the art. In addition, the computer system 140 includes peripheral devices such as, for example, a display device 153, a keyboard 156, and a mouse 159. The computer system 140 may also include other peripheral devices such as, for example, keypad, touch pad, touch screen, microphone, scanner, joystick, or one or more push buttons, etc. The peripheral devices may also include indicator lights, speakers, printers, etc. Specific display device 153 may be, for example, a cathode ray tube (CRT), liquid crystal display screen, gas plasma-based flat panel display, or other type of display device.

A number of software components are stored on the memory 146 and are executable by the processor 143. Such components include, for example, the RIP manager 106, an operating system 163, one or more print jobs 103, one or more RIPped partitions 119, and one or more RIPped output files 123. It is understood that the print jobs 103, RIPped partitions 119, and the RIPped output files 123 may or may not appear within the memory 146 from time to time as is dictated by the operation of the RIP manager 106 as will be described.

The RIP manager 106 includes a number of exemplary components that perform various operations. As shown in FIG. 2, each component may comprise one or more modules, objects, or other groupings or encapsulations of underlying functionality as implemented in programming code. Also, the same underlying functionality may exist in one or more modules, objects, or other groupings or encapsulations that differ from those shown in FIG. 2 without departing from the present invention as defined by the appended claims. Also, the RIP manager 106 may be expressed in any one of a number of programming languages such as, for example, C++, JAVA™, or other programming language.

The exemplary components of the RIP manager 106 may comprise a print job preprocessor 173, the partition manager 176, a RIP handler 179, and a database 183 within which a partition specification 186 is stored that maintains a partition RIP status 189 for each of the partitions of the print job 103 as was discussed above. The RIP manager 106 may also include a pipeline configuration system 193 that is manipulated by users to configure a number of pipelines 113. Specifically, a user may manipulate the pipeline configuration system 193 to create one or more pipelines 113 and associate one or more RIP engines 109 with each pipeline 113 as will be described. In manipulating the pipeline configuration system 193, a number of user interfaces 196 are generated by the pipeline configuration system 193 on the display device 153. To manipulate the pipeline configuration system 193, a user may manipulate the keyboard 156, the mouse 159, or other input device as is appropriate.

Figure 3:
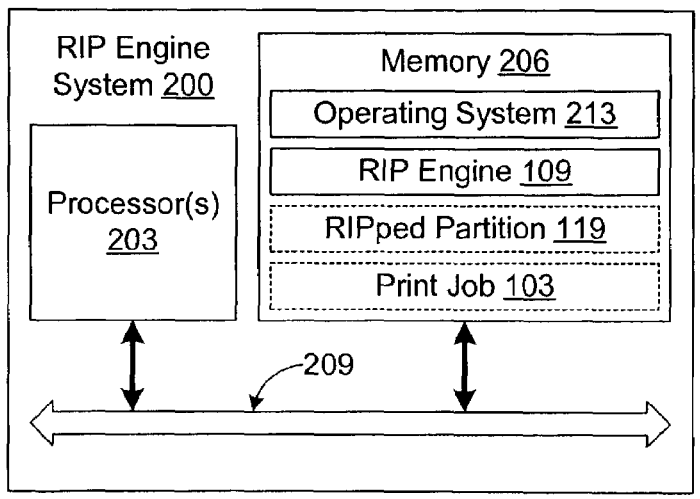
FIG. 3 is a schematic of a RIP engine of FIG. 1 that is employed to RIP one or more partitions of a print job.

Turning then to FIG. 3, shown is a RIP engine system 200 according to an embodiment of the present invention. The RIP engine system 200 includes a processor circuit having a processor 203 and a memory 206, both of which are coupled to a local interface 209. The local interface 209 may be, for example, a data bus with an accompanying control/address bus as can be appreciated by those with ordinary skill in the art. In this respect, the RIP engine system 200 may comprise a computer system or other device with like capability.

The RIP engine system 200 includes a number of software components that are stored in the memory 206 and are executable by the processor 203. Such components may comprise, for example, an operating system 213, a RIP engine 109, a RIPped partition 119, and the print job 103. The RIPped partition 119 and the print job 103 are stored in the memory 206 as needed, or when created from time to time as mandated by the operation of the RIP engine 109 as will be described. Also, the RIP engine 109 may be expressed in any one of a number of programming languages such as, for example, C++, JAVA™, or other programming language.

With reference to both FIGS. 2 and 3, each of the memories 146 and 206 are defined herein as both volatile and nonvolatile memory and data storage components. Volatile components are those that do not retain data values upon loss of power. Nonvolatile components are those that retain data upon a loss of power. Thus, the memories 146 and 206 may each comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, each of the processors 143 and 203 may represent multiple processors and each of the memories 146 and 206 may represent multiple memories that operate in parallel processing circuits, respectively. In such a case, each of the local interfaces 149 and 209 may be an appropriate network that facilitates communication between any two of the multiple processors, between any processor and any of the memories, or between any two of the memories, etc. The processors 143 and 203 may be electrical or optical in nature.

Figure 4:
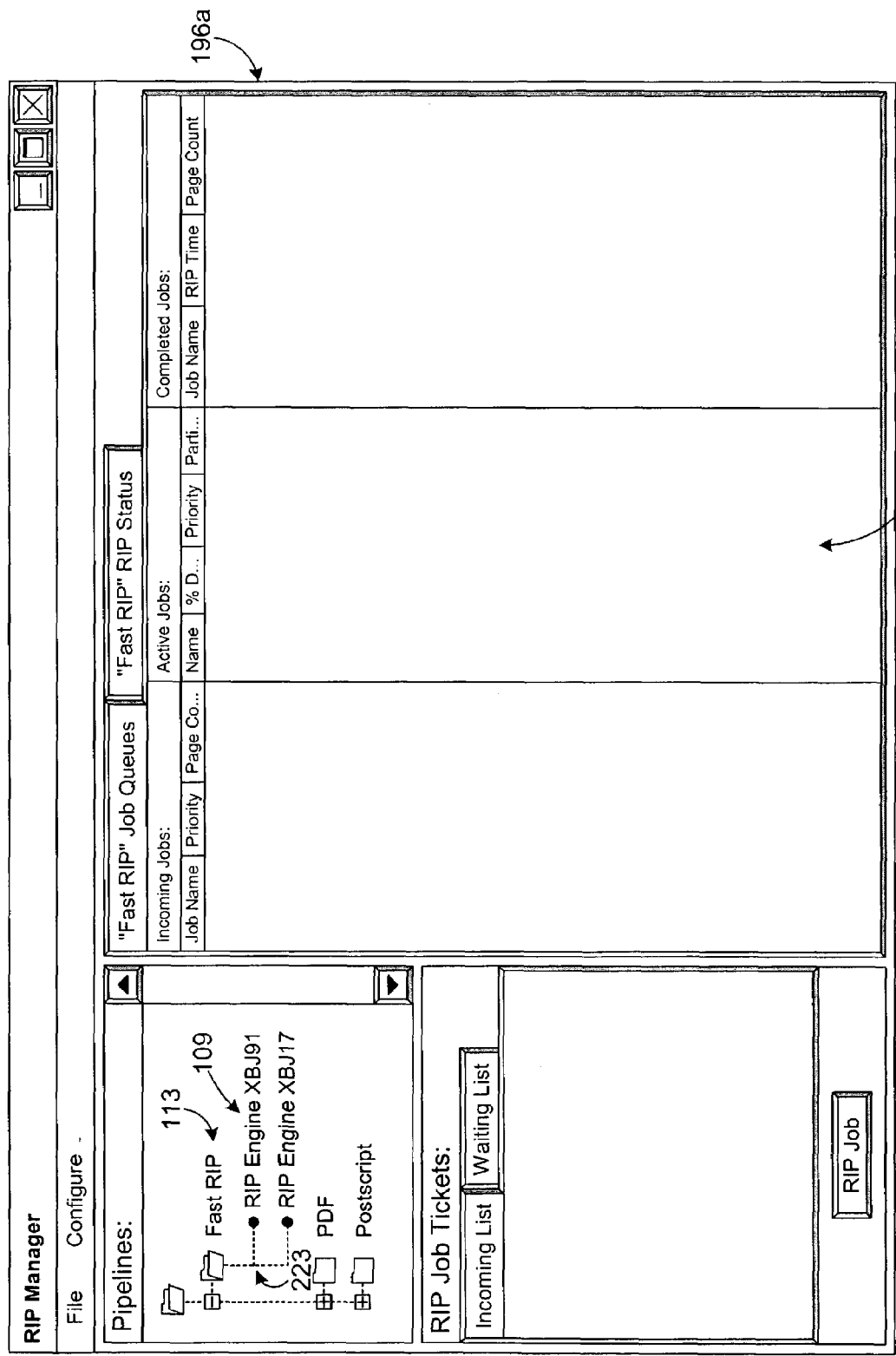
FIG. 4 is a drawing of an exemplary user interface generated by a pipeline configuration system in the RIP Manager of FIG. 2 that illustrates one or more pipelines and the RIP engines associated therewith.

Referring next to FIG. 4, shown is an exemplary user interface 196a that is generated by the pipeline configuration system 193 (FIG. 2) to create pipelines 113 and to associate RIP engines 109 with such pipelines 113 according to an embodiment of the present invention. The user interface 196a depicts one or more pipelines 113 and one more RIP engines 109 associated therewith. Specifically, the user interface 196a illustrates an association 223 between the respective pipelines 113 and each of the RIP engines 109 associated therewith. This is done, for example, with a tree structure, although other structures may be employed to illustrate the associations 223. The user interface 196a also includes a job queue tab 226 that lists a number of print jobs 103 that are waiting for processing, are being actively processed, or have completed processing. Specifically, the processing described herein refers to a raster image processing. It may be the case that no RIP engines 109 are associated with a particular pipeline 113. In such case, all print jobs that are received for such a pipeline are placed in a queue until such time that RIP engines 109 are associated with the pipeline 113. This provides a user with significant flexibility in assigning RIP engines 109 to pipelines 113 from time to time based upon the need to RIP print jobs 103 of greater importance at the expense of other less important print jobs 103.

Figure 5:
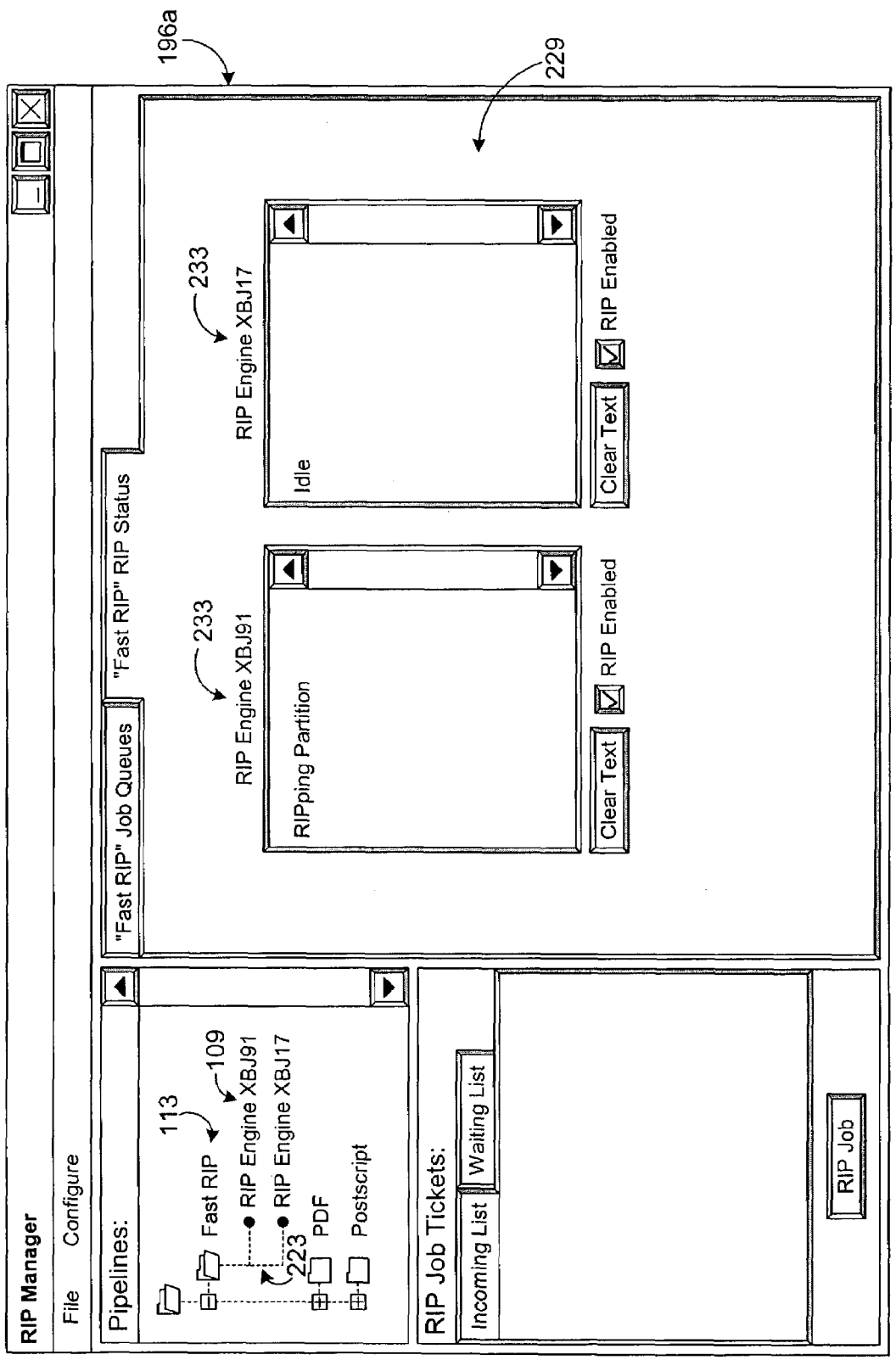
FIG. 5 is a drawing of the exemplary user interface of FIG. 4 that further illustrates an exemplary RIP engine status tab.

With reference to FIG. 5, shown is a second view of the exemplary user interface 196a that illustrates a RIP status tab 229 according to an embodiment of the present invention. In this respect, the RIP status tab 229 includes RIP status windows 233. Each of the RIP status windows 233 details a status of a respective one of the RIP engines 109 that are associated with a currently highlighted pipeline 113. In this respect, each of the pipelines 113 may be highlighted by opening a folder associated therewith. However, such highlighting may be indicated in any one of a number of different ways as can be appreciated by those with ordinary skill in the art.

Figure 6:
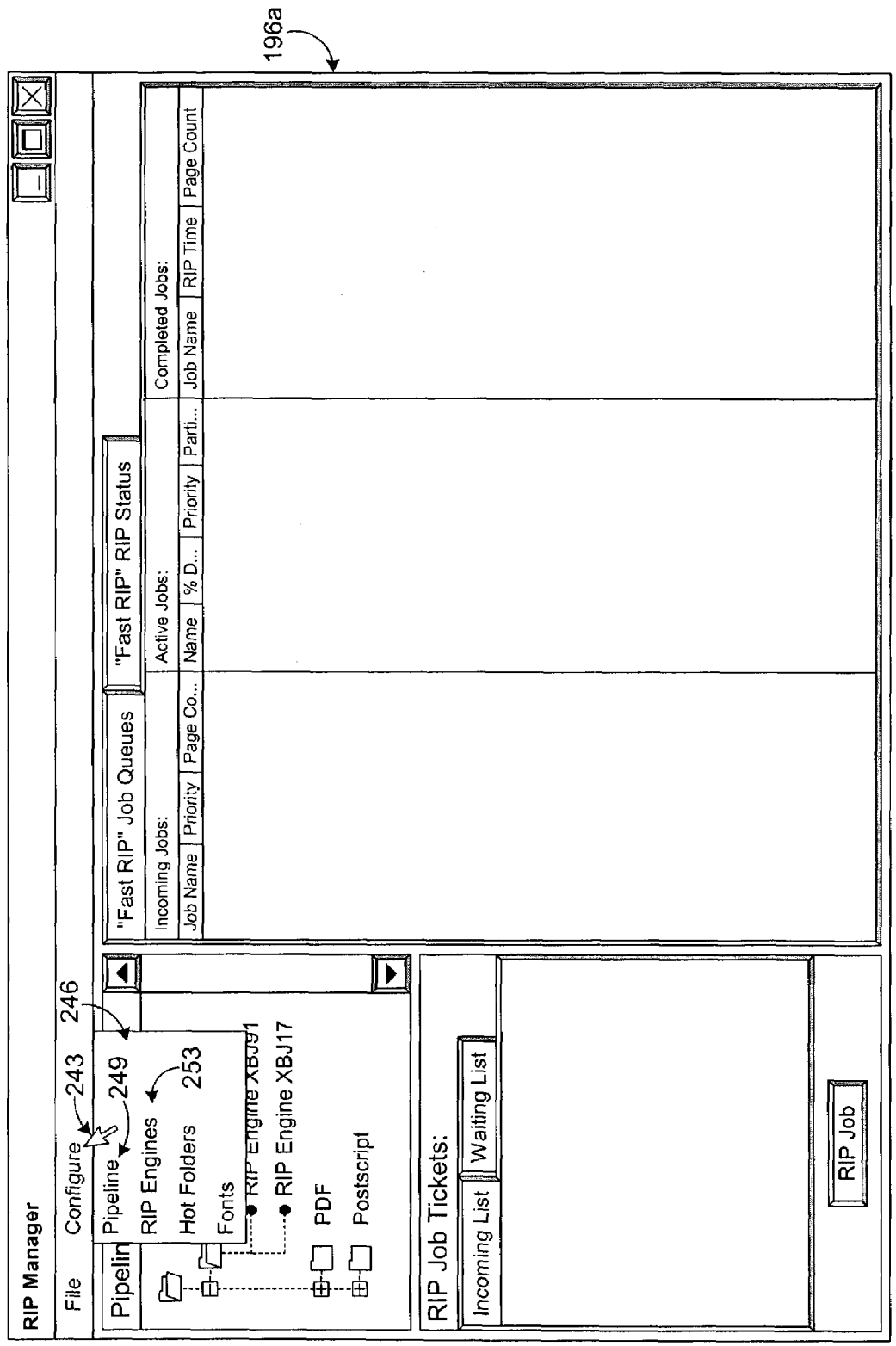
FIG. 6 is a drawing of the exemplary user interface of FIG. 4 that further illustrates a drop down menu that may be manipulated by a user to configure a pipeline or a RIP engine in the RIP manager of FIG. 2.

Turning then to FIG. 6, shown is a third view of the exemplary user interface 196a that illustrates a manipulation by the user to create a pipeline 113 (FIG. 5) and to associate a RIP engine 109 (FIG. 5) therewith. In this respect, a user may position a cursor 243 to generate a configuration pull down menu 246 that lists a pipeline option 249 and a RIP engine option 253. A user may "click" on or otherwise manipulate the pipeline option 249 which causes a subsequent user interface to appear on the display device 153 to allow a user to configure a new pipeline. As employed herein, the term "clicking" is defined as positioning a cursor over a graphical component and manipulating the component such as, for example, with a pushbutton on a mouse, etc. If a user clicks on the RIP engine option 253, then a subsequent user interface appears on the display device 153 that facilitates the user configuration of RIP engines 109 for a specified pipeline 113. Such subsequent user interfaces are discussed with reference to later figures.

Figure 7:
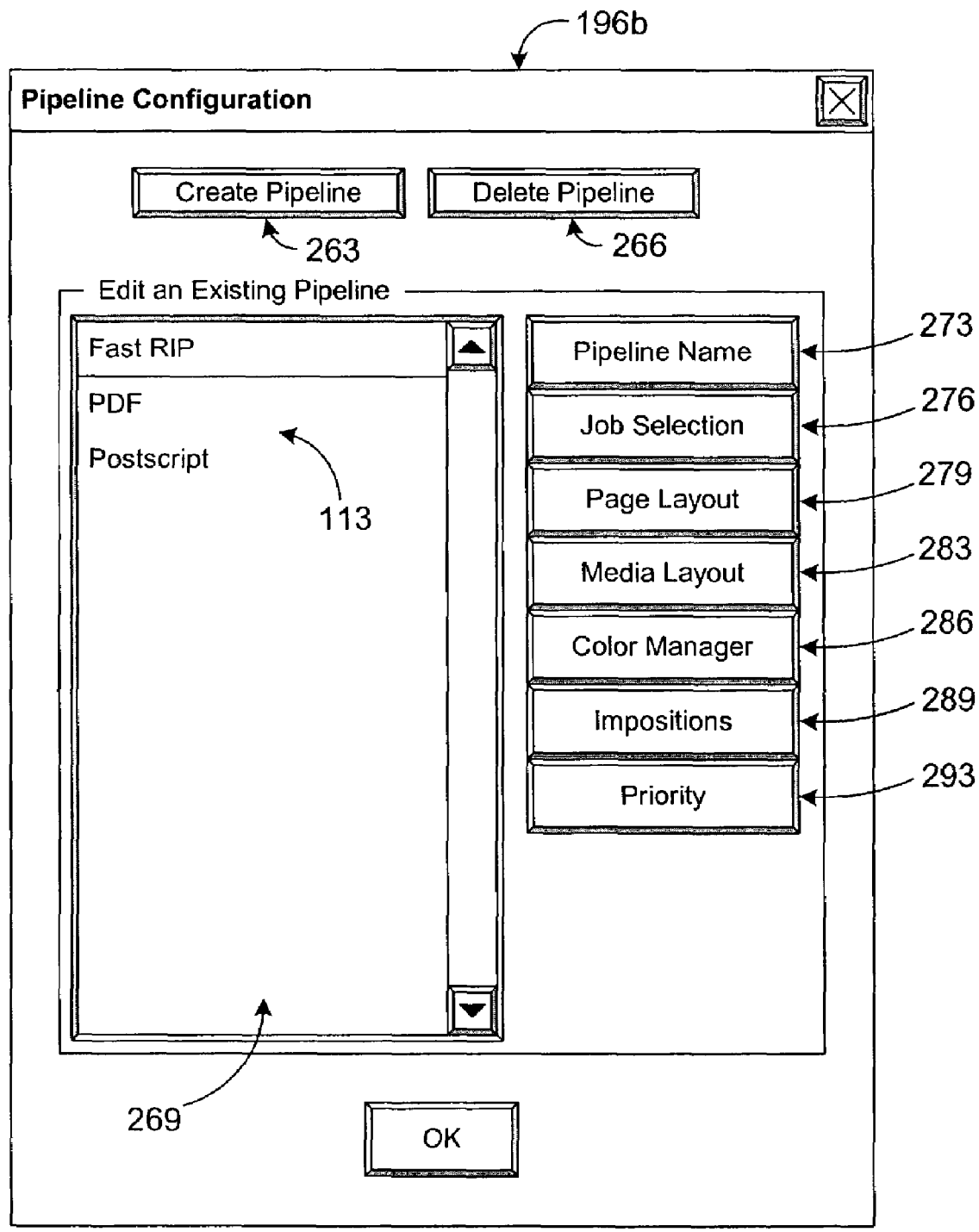
FIG. 7 is a drawing of an exemplary user interface that is generated by a pipeline configuration system in the RIP manager of FIG. 2 to configure a pipeline.

Turning then to FIG. 7, shown is a pipeline configuration interface 196b according to an embodiment of the present invention. The pipeline configuration interface 196b includes a "create pipeline" button 263 and a "Delete" pipeline button 266. The create pipeline button 263 and the delete pipeline button 266 may be manipulated to create a new pipeline 113 (FIG. 4) or to delete a new pipeline 113, respectively. The pipeline configuration interface 196b also includes a pipeline display window 269 in which current existing pipelines 113 are displayed. A number of exemplary buttons are provided that allow a user to create or modify settings associated with the pipelines 113 listed in the pipeline display window 269. These buttons include, for example, a "pipeline name" button 273, a "job selection" button 276, a "page layout" button 279, a "media layout" button 283, a "color manager" button 286, an "impositions" button 289, and a "priority" button 293. Upon clicking or otherwise manipulating any one of the buttons 273-293, one or more user interfaces are generated with which a user may enter and/or edit various parameters associated with a highlighted one of the pipelines 113 listed in the pipeline display window 269. Assuming that the user has completed all desired configuration tasks, the user may click on or otherwise manipulate the "OK" button 296 to revert back to the user interface 196a (FIG. 5).

Figure 8:
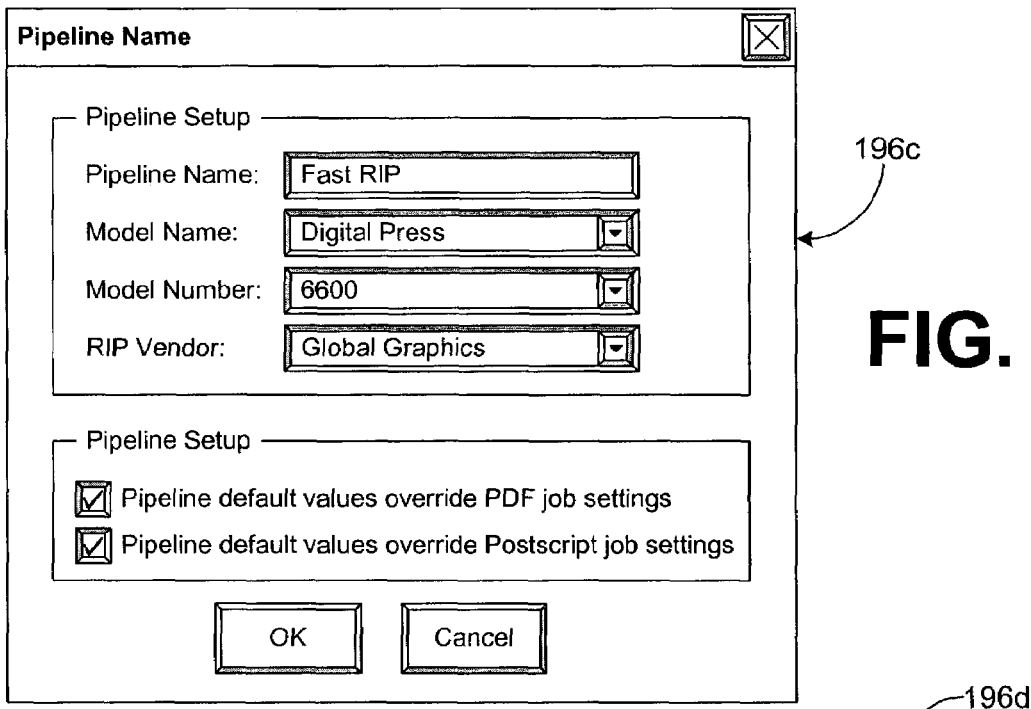
FIG. 8 is a drawing of an exemplary user interface that is generated by a pipeline configuration system in the RIP manager of FIG. 2 to input information employed in configuring a pipeline.

Referring next to FIG. 8, shown is a user interface 196c that is generated in response to a user manipulation of the "pipeline name" button 273 (FIG. 7) according to an embodiment of the present invention. The user interface 196c provides the user with the ability to input various parameters and/or information associated with a selected one of the pipelines 113 (FIG. 7). Such parameters and/or information may comprise, for example, a pipeline name, a model name of an associated printing device 126 (FIG. 1), a model number of the associated printing device 126, a vendor name of the RIP engines 109 (FIG. 1), and other information. Also, various user interface components may be employed to provide a user with an ability to specify various pipeline settings, etc.

Figure 9:
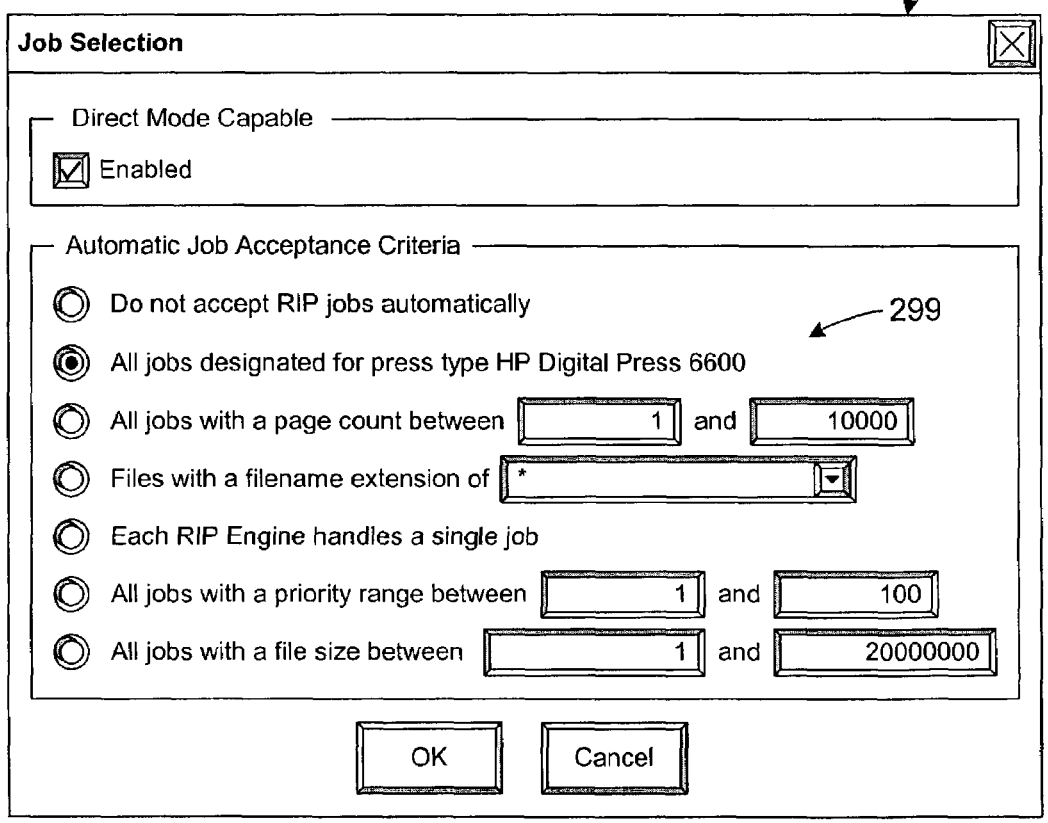
FIG. 9 is a drawing of an exemplary user interface that is generated by a pipeline configuration system in the RIP manager of FIG. 2 to specify print job acceptance criteria associated with a pipeline.

Turning then to FIG. 9, shown is a user interface 196d according to an embodiment of the present invention. The user interface 196d provides a user with an ability to specify a set of pipeline acceptance criteria 299 that is employed to determine whether a print job 103 (FIG. 1) can be accepted by a respective pipeline 113 (FIG. 7) selected in the pipeline configuration interface 196b (FIG. 7). It is understood that the various graphical components employed to specify the pipeline acceptance criteria 299 merely provide examples of the various ways that such criteria may be selected or otherwise specified.

In this respect, exemplary criteria may include determining whether a pipeline 113 will accept print jobs for RIPping automatically, restricting print jobs 103 to those designated for a particular type of print device 126, specifying a maximum page count for acceptable print jobs, specifying an accepted file type of the print job 103, specifying a specific page description language for the print job that will be accepted, specifying an acceptable priority range, or specifying a range of file sizes for acceptable print jobs. In addition, it is understood that other criteria may be employed and that the criteria is not limited to that which is expressly described herein.

Figure 10:
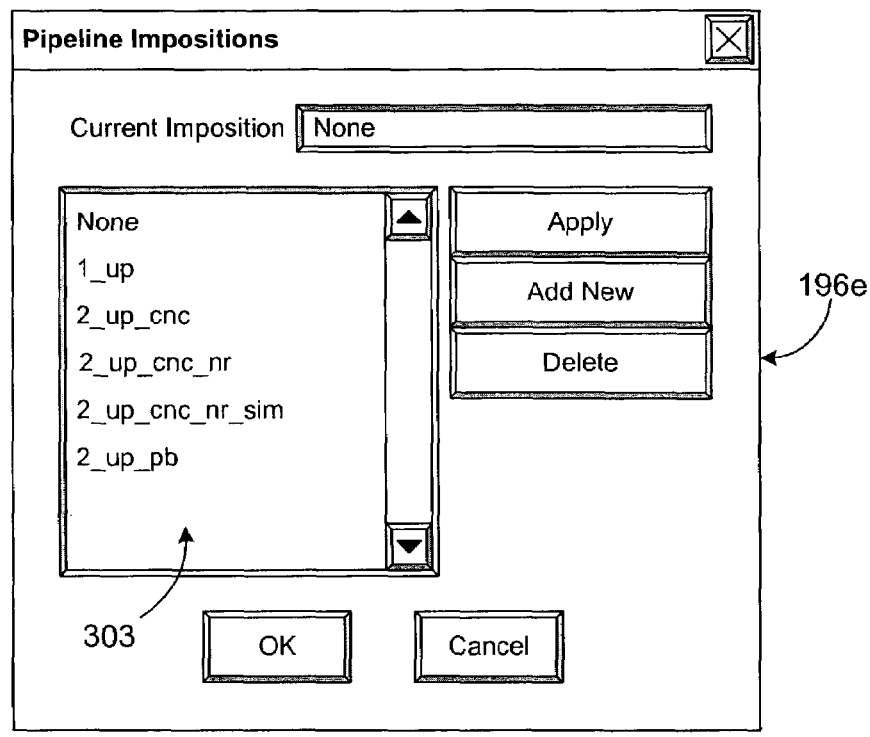
FIG. 10 is a drawing of an exemplary user interface that is generated by a pipeline configuration system in the RIP manager of FIG. 2 to specify an imposition that is associated with a pipeline.

With respect to FIG. 10, shown is a user interface 196e that provides for an association of an imposition with the respective pipeline 113 (FIG. 7). In this regard, the user interface 196e includes a listing of a number of impositions 303 that can be selected for association with a respective pipeline 113. In addition, the user interface 196e includes components that may be manipulated to add or delete impositions, etc. As contemplated herein, an imposition refers to an arrangement or layout of pages on a print media as can be appreciated by those with ordinary skill in the art.

Figure 11:
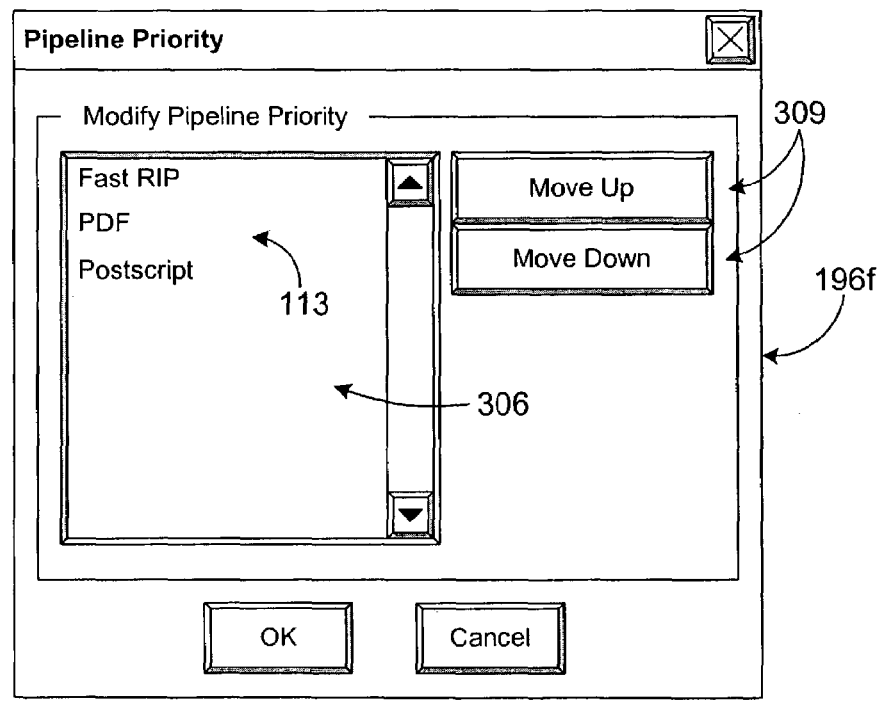
FIG. 11 is a drawing of an exemplary user interface that is generated by a pipeline configuration system in the RIP manager of FIG. 2 to specify a priority associated with each configured pipeline in the RIP manager.

Turning to FIG. 11, shown is a user interface 196f that includes a pipeline priority window 306 that lists a number of pipelines 113 in an order of priority. That is to say, the priority associated with each of the pipelines 113 is determined based upon its position among other pipelines 113 listed in the pipeline priority window 306. In addition, the user interface 196f includes buttons 309 that may be manipulated with respect to a selected one of the pipelines 113 in the pipeline priority window 306 to alter a position of the selected pipeline 113 in the pipeline priority window 306, thereby altering the relative priorities of the pipelines 113 listed therein.

Figure 12:
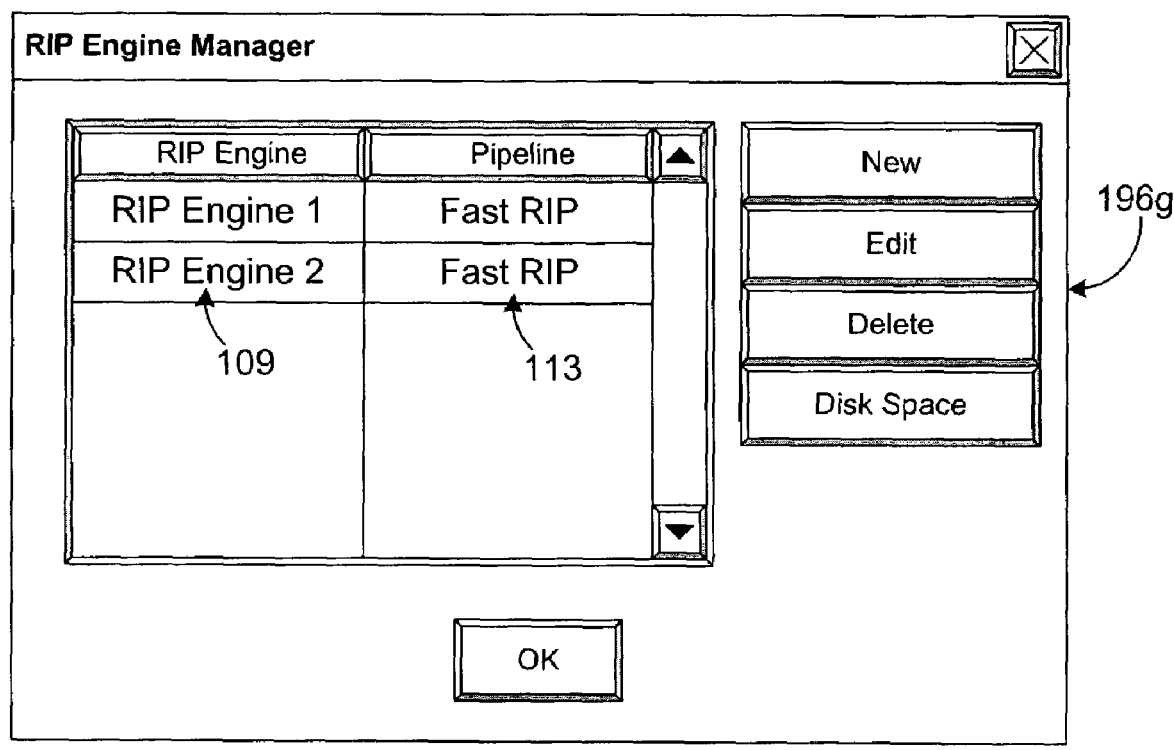
FIG. 12 is a drawing of an exemplary user interface that is generated by a pipeline configuration system in the RIP manager of FIG. 2 to configure one or more RIP engines associated with one or more pipelines configured in the RIP manager.

Referring next to FIG. 12, shown is a RIP engine manager interface 196g that is generated upon a manipulation of the RIP engine option 253 (FIG. 6) according to an embodiment of the present invention. In this respect, the RIP engine manager interface 196g depicts each RIP engine 109 in association with a respective pipeline 113. The RIP engine manager interface 196g also includes buttons or other components that provide an ability to add and/or edit configurations of RIP engines 109 as is appropriate. Such components may cause the generation of additional user interfaces that facilitate the user input of parameters associated with the RIP engines 109 listed in the RIP engine manager interface 196g.

Figure 13A:
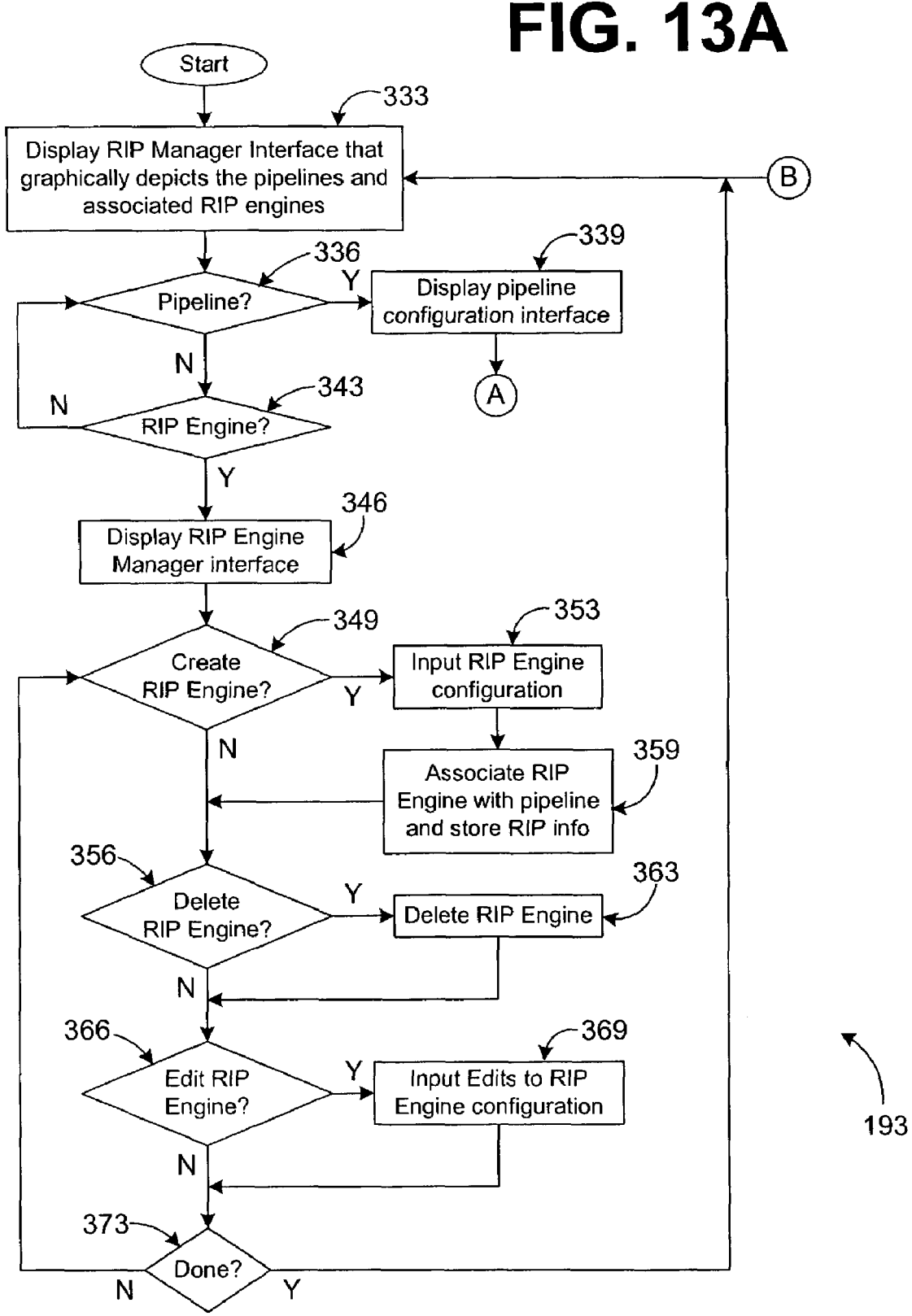
FIGS. 13A and 13B depict an exemplary flow chart that illustrates a pipeline configuration system executed as a portion of the RIP manager of FIG. 2 to configure a pipeline.
Figure 13B:
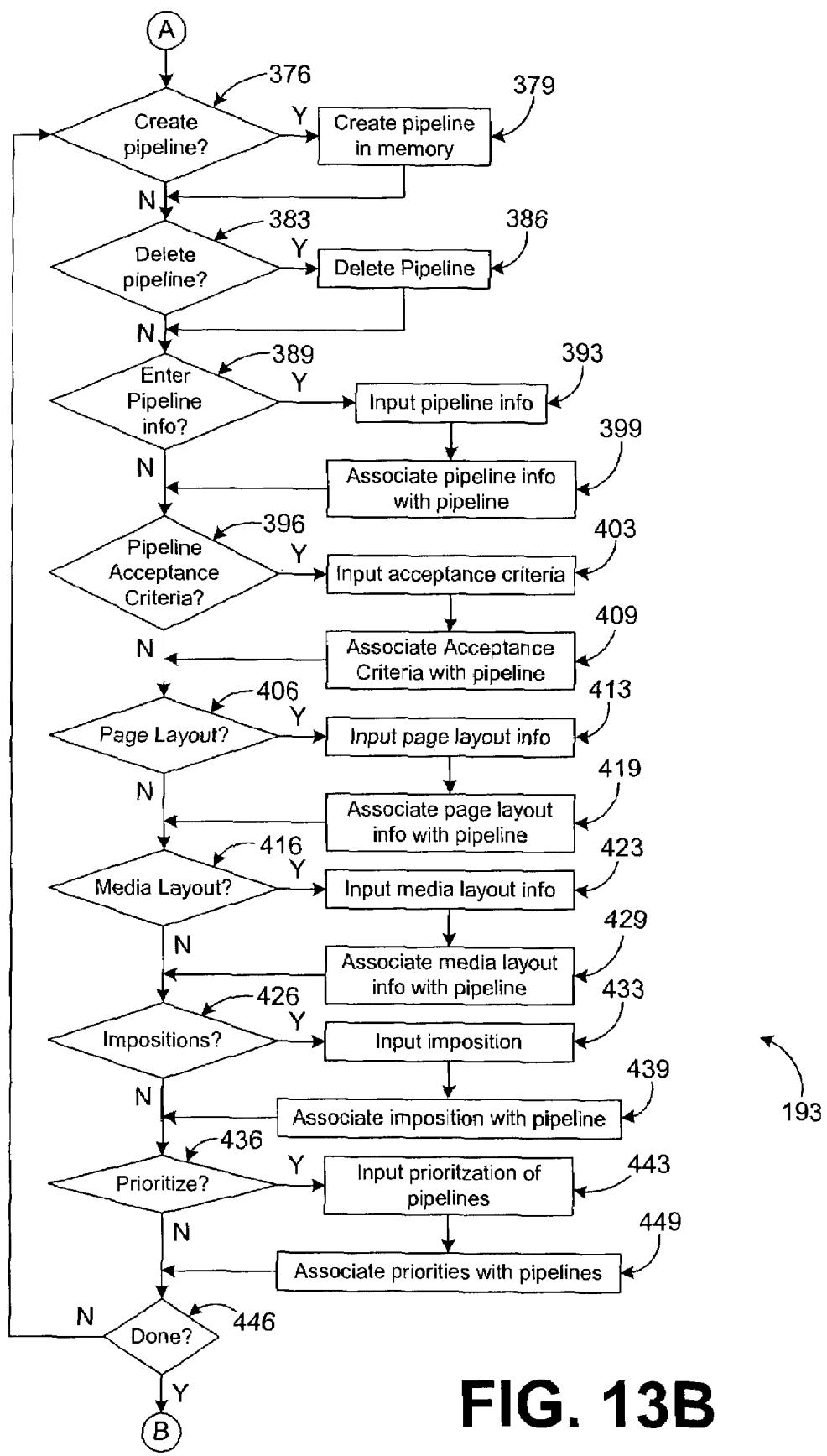

With reference to FIGS. 13A and 13B, shown is an exemplary flow chart of the pipeline configuration system 193 according to an embodiment of the present invention. Alternatively, the flowchart of FIGS. 13A and 13B may also be viewed as depicting steps of a method implemented in the computer system 140 (FIG. 2) to configure one or more pipelines 113 (FIG. 2) and to associate one more RIP engines 109 (FIG. 2) with respective ones of the pipelines 113.

Beginning with box 333, the pipeline configuration system 193 displays the user interface 196a (FIG. 4) on the display device 153 (FIG. 2) that associates the RIP engines 109 (FIG. 4) with respective pipelines 113 (FIG. 4). In addition, the various tabs of the user interface 196a are displayed as selected by a user. Thereafter, the pipeline configuration system 193 proceeds to box 336 in which it is determined whether the pipeline option 249 (FIG. 6) has been selected by a user. If such is the case, then the pipeline configuration system 193 proceeds to box 339 in which the pipeline configuration interface 196b, for example, is generated on the display device 153. Thereafter, the pipeline configuration system 193 proceeds to connector A as shown.

However, assuming that the user has not manipulated the pipeline option 249 in box 336, then the pipeline configuration system 193 proceeds to box 343 in which it is determined whether the user has manipulated the RIP engine option 253 (FIG. 6) to add, delete, or edit configurations of RIP engines 253 in association with one or more pipelines 113. If such is the case, then the pipeline configuration system 193 proceeds to box 346. Otherwise, the pipeline configuration system 193 reverts back to box 336.

In box 346, the RIP engine manager interface 196g is generated on the display device 153. Thereafter, in box 349, the pipeline configuration system 193 determines whether a configuration for a RIP engine 109 is to be added. If such is the case, then the pipeline configuration system 193 proceeds to box 353. Otherwise, the pipeline configuration system 193 moves to box 356. In box 353, the various parameters and/or information relative to the configuration of the new RIP engine 109 are input by the pipeline configuration system 193. This may be accomplished, for example, by generating one or more user interfaces that facilitate a user input of the parameters and/or information, etc. One such parameter may be, for example, the pipeline 113 with which the new RIP engine is associated. Thereafter, in box 359 the RIP engine 109 is associated with the identified pipeline 113. This may be done, for example, by including the RIP engine 109 and the pipeline 113 in a table or other data structure that maintains associations between elements.

From box 359 the pipeline configuration system 193 proceeds to box 356 in which it is determined whether a configuration for a RIP engine 109 is to be deleted. If such is the case, then the pipeline configuration system 193 proceeds to box 363 in which the configuration information of the selected RIP engine 109 is deleted. If no deletion is to occur in box 356, or if the deletion is completed in box 363, then in box 366 the pipeline configuration system 193 determines whether a configuration for a RIP engine 109 is to be edited. If so, then the pipeline configuration system 193 proceeds to box 369 to input edits of the selected RIP engine 109.

This may be accomplished, for example, by generating one or more user interfaces that facilitate a user input of the parameters and/or information, etc. If no edits are to be made in box 366, or if edits are completed in box 369, then the pipeline configuration system 193 proceeds to box 373. In box 373 it is determined whether the configuration of RIP engines 109 is complete. This may be determined, for example, if a user clicks or otherwise manipulates an "OK", "Done" or other appropriate button displayed in the RIP engine manager interface 196g. If so, then the pipeline configuration system 193 reverts back to box 333. Otherwise, the pipeline configuration system 193 reverts back to box 349.

Referring back to box 339, assuming that the pipeline configuration interface 196b is displayed on the display device 153, then the pipeline configuration system 193 proceeds to box 376 through connector A. In box 376 it is determined whether a new pipeline 113 is to be created as indicated by a user manipulation of the "create pipeline" button 263. If such is the case, then the pipeline configuration system 193 proceeds to box 379 in which the pipeline is created in the memory 146 (FIG. 2) by inclusion, for example, in a table, etc. If no pipeline 113 is to be created in box 376, or if a new pipeline has been created in box 379, the pipeline configuration system 193 proceeds to box 383.

In box 383, the pipeline configuration system 193 determines whether a pipeline 113 (FIG. 7) is to be deleted. This may be determined, for example, by detecting a manipulation of the "Delete pipeline" button 266 (FIG. 7). If such is the case, then the pipeline configuration system 193 proceeds to box 386 to delete the pipeline 113 that is highlighted in the pipeline display window 269 (FIG. 7). The pipeline configuration system 193 may also provide for a dialog box that confirms the desire to delete a particular pipeline 113. If no pipeline 113 is to be deleted in box 383 or if the pipeline 113 has been deleted in box 386, then the pipeline configuration system 193 proceeds to box 389.

In box 389 it is determined whether information relative to one of the pipelines 113 in the pipeline display window 269 is to be input by the pipeline configuration system 193. This may be determined, for example, by detecting whether a user has manipulated the "pipeline name" button 273 (FIG. 7) in the pipeline configuration interface 196b (FIG. 7). If such is the case, then the pipeline configuration system 193 proceeds to box 393. Otherwise, the pipeline configuration system 193 moves to box 396 as shown. In box 393, the pipeline configuration system 193 inputs information relative to a respective pipeline 113 such as the information input using the user interface 196c (FIG. 8) thereafter, and box 399 the pipeline information is associated with the respective pipeline 113 in the memory 146 using an appropriate data structure such as a table, etc. Then, the pipeline configuration system 193 proceeds to box 396.

In box 396, the pipeline configuration system 193 determines whether pipeline acceptance criteria are to be entered or otherwise configured for a respective pipeline 113. Such may determined by detecting a manipulation of the "Job selection" button 276 (FIG. 7). If such is the case then the pipeline configuration system 193 proceeds to box 403 to input new or edited acceptance criteria for a respective one of the pipelines 113. On the other hand, if in box 396 no pipeline acceptance criteria are to be entered or edited, then the pipeline configuration system proceeds to box 406. Once the acceptance criteria is input in box 403, then the pipeline configuration system 193 proceeds to box 409 to associate the acceptance criteria with a respective one of the pipelines 113. Thereafter, the pipeline configuration system 193 moves to box 406.

In box 406, the pipeline configuration system 193 determines whether a page layout is to be entered or otherwise edited for a respective one of the pipelines 113. This may be determined by detecting a manipulation of the page layout button 279 (FIG. 7). If such is the case then the pipeline configuration system 193 proceeds to box 413. Otherwise, the pipeline configuration system 193 moves to box 416. In box 413, page layout parameters are input by the pipeline configuration system 193. In this respect, the pipeline configuration system 193 generates one or more user interfaces (not shown) that facilitate the input of such parameters by a user. The page layout parameters may include, for example, page size, page width, page height, measuring units, number of copies, horizontal centering, vertical centering, page trimming options, and other parameters associated with the layout of the page upon a print media. Thereafter, in box 419 the page layout information is associated with a respective one of the pipelines 113 highlighted in the pipeline display window 269. In this regard, such information is stored in an appropriate data structure in the memory 146 such as a table, etc. Thereafter, the pipeline configuration system 193 moves to box 416 as shown.

In box 416, the pipeline configuration system 193 determines whether a media layout is to be entered or otherwise edited for a respective one of the pipelines 113. This may be determined by detecting a manipulation of the media layout button 283 (FIG. 7). If such is the case then the pipeline configuration system 193 proceeds to box 423. Otherwise, the pipeline configuration system 193 moves to box 426. In box 423, media layout attributes are input by the pipeline configuration system 193. In this respect, the pipeline configuration system 193 generates one or more user interfaces (not shown) that facilitate the input of such attributes by a user. The media is defined herein as the target media upon which the print job 103 (FIG. 1) is to be printed. The media layout information may comprise, for example, the media type, media width, media height, left and right margin sizes, measuring units, media color, media weight, media grain, media rotation specifications, mirroring techniques, negative features, and other attributes. Thereafter, in box 429 the media layout information is associated with a respective one of the pipelines 113 highlighted in the pipeline display window 269. In this regard, such information is stored in an appropriate data structure in the memory 146 such as a table, etc. Thereafter, the pipeline configuration system 193 moves to box 426 as shown.

In box 426, the pipeline configuration system 193 determines whether an imposition is to be specified or otherwise edited for a respective one of the pipelines 113. This may be determined by detecting a manipulation of the "impositions" button 289 (FIG. 7). If such is the case then the pipeline configuration system 193 proceeds to box 433. Otherwise, the pipeline configuration system 193 moves to box 436. In box 433, a selection of an imposition 303 (FIG. 10) is input by the pipeline configuration system 193. In this respect, the pipeline configuration system 193 generates one or more user interfaces that facilitate the input of such information by a user such as the exemplary user interface 196e (FIG. 10). Thereafter, in box 439 the selected imposition 303 is associated with a respective one of the pipelines 113 highlighted in the pipeline display window 269. In this regard, such information is stored in an appropriate data structure in the memory 146 such as a table, etc. Thereafter, the pipeline configuration system 193 moves to box 436 as shown.

In box 436, the pipeline configuration system 193 determines whether the prioritization of the pipelines 113 displayed in the pipeline display window 269 is to be altered. This may be determined by detecting a manipulation of the "priority" button 293 (FIG. 7). If such is the case then the pipeline configuration system 193 proceeds to box 443. Otherwise, the pipeline configuration system 193 moves to box 446. In box 443, the prioritization of the pipelines 113 is input by the pipeline configuration system 193. In this respect, the pipeline configuration system 193 generates one or more user interfaces that facilitate the specification of the priority of the pipelines 113 by a user such as the exemplary user interface 196f (FIG. 11). Thereafter, in box 449 the priorities of each of the pipelines 113 as specified in box 443 are associated the pipelines 113, respectively. In this regard, the priority information is stored in an appropriate data structure in the memory 146 such as a table, etc. Thereafter, the pipeline configuration system 193 moves to box 446 as shown.

In box 446 the pipeline configuration system 193 determines whether the user has completed the configuration of a respective pipeline 113. This may be determined, for example, by detecting whether a user has manipulated the "OK" button 296 (FIG. 7). If such is the case, then the pipeline configuration system 193 reverts back to box 333 through connector B as shown.

In addition, the pipeline configuration system 193 may also include other functionality beyond that described herein as depicted on the user interfaces 196a-g.

Figure 14:
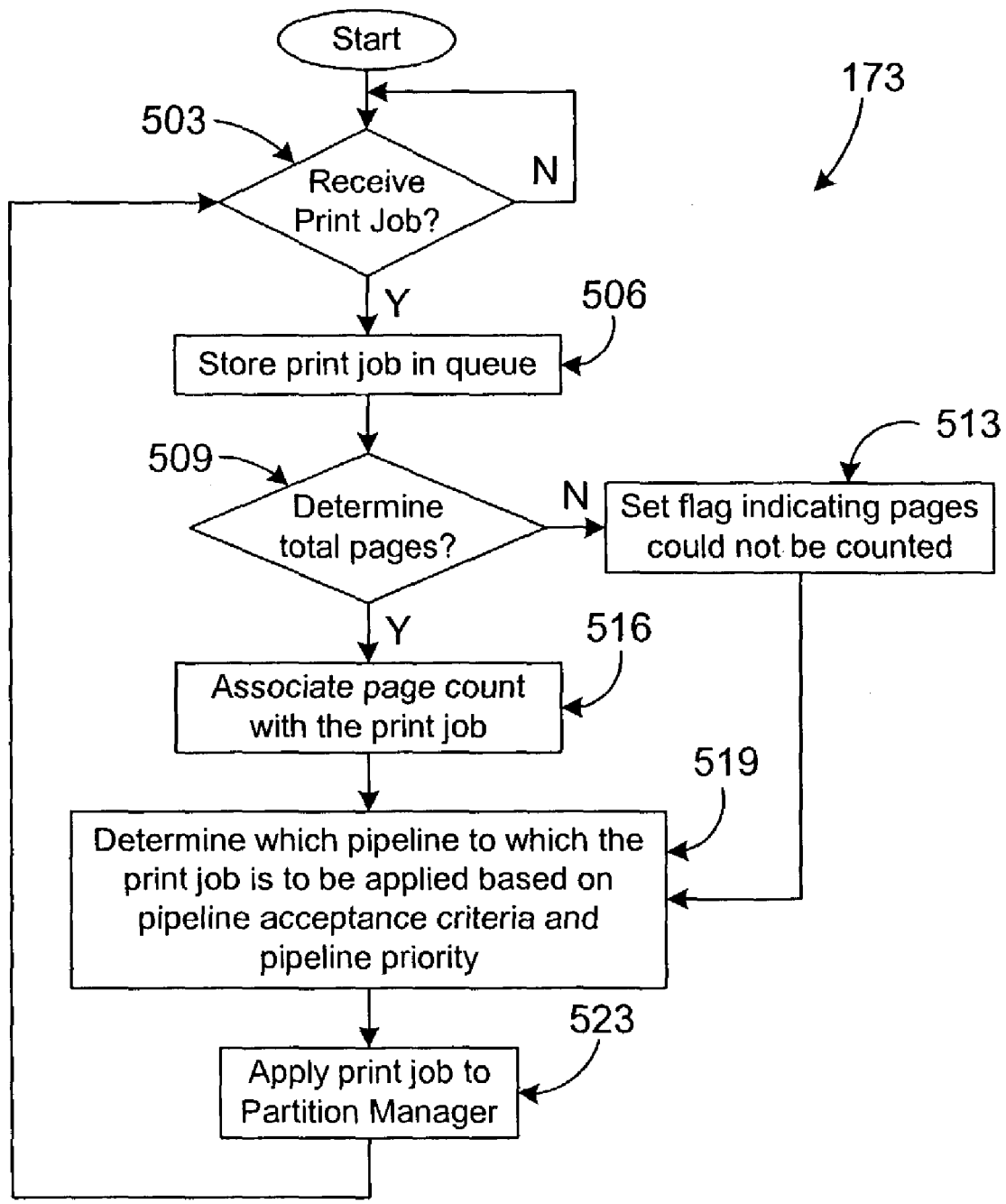
FIG. 14 is an exemplary flow chart of a print job preprocessor that is executed as a portion of the RIP manager of FIG. 2.

With reference to FIG. 14, shown is an exemplary flow chart of the print job preprocessor 173 according to an embodiment of the present invention. Alternatively, the flowchart of FIG. 14 may be viewed as depicting steps in a method implemented in the computer system 140 in order to perform raster image processing on a print job 103 (FIG. 1).

Beginning in box 503, the print job preprocessor 173 waits to receive a print job 103 that is embodied, for example, in a page description language that requires raster image processing for printing. Assuming that a print job 103 is received by the print job preprocessor 173 in box 503, then the print job preprocessor 173 proceeds to box 506 in which the print job 103 is stored in a queue or other portion of the memory 146 (FIG. 2). Thereafter, in box 509, the print job preprocessor 173 determines whether a total number of pages embodied in the print job 103 can be ascertained from the print job 103 itself. If not, then the print job preprocessor 173 proceeds to box 513. Otherwise, the print job preprocessor 173 moves to box 516. In box 513, the print job preprocessor 173 sets a flag that is associated with the print job 103 that indicates that the pages of the print job 103 could not be counted. Thereafter, the print job preprocessor 173 proceeds to box 519.

Assuming that the print job preprocessor 173 has proceeded to box 516, then the print job preprocessor 173 determines the total page count of the print job 103 and associates such page count with the print job 103. Then, in box 519, the print job preprocessor 173 determines which pipeline 113 (FIG. 1) to which the print job 103 is to be applied based upon the priorities assigned to each of the existing pipelines 113 as well as the pipeline acceptance criteria 299 (FIG. 9) associated with each pipeline 113. In this respect, the print job preprocessor 173 scrutinizes the pipeline acceptance criteria 299 of each of the pipelines 113 in turn according to the priorities assigned to each of the pipelines 113. This is done until the print job 103 meets the pipeline acceptance criteria 299 of one of the pipelines 113. Thereafter, in box 523 the print job 103 is applied to the partition manager 176.

Figure 15A:
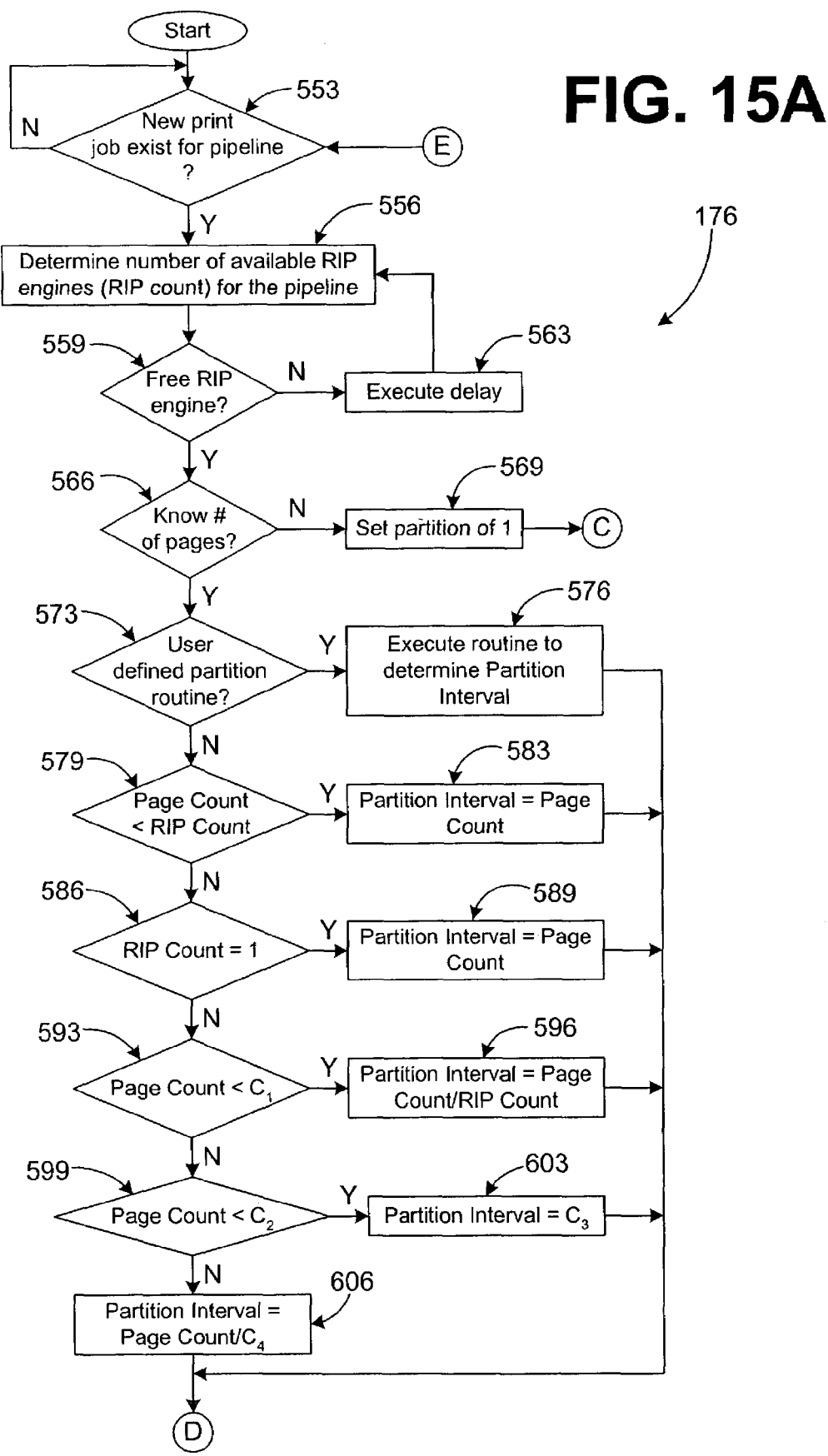
FIGS. 15A and 15B depict an exemplary flow chart of a partition manager that is executed as a portion of the RIP manager of FIG. 2.
Figure 15B:
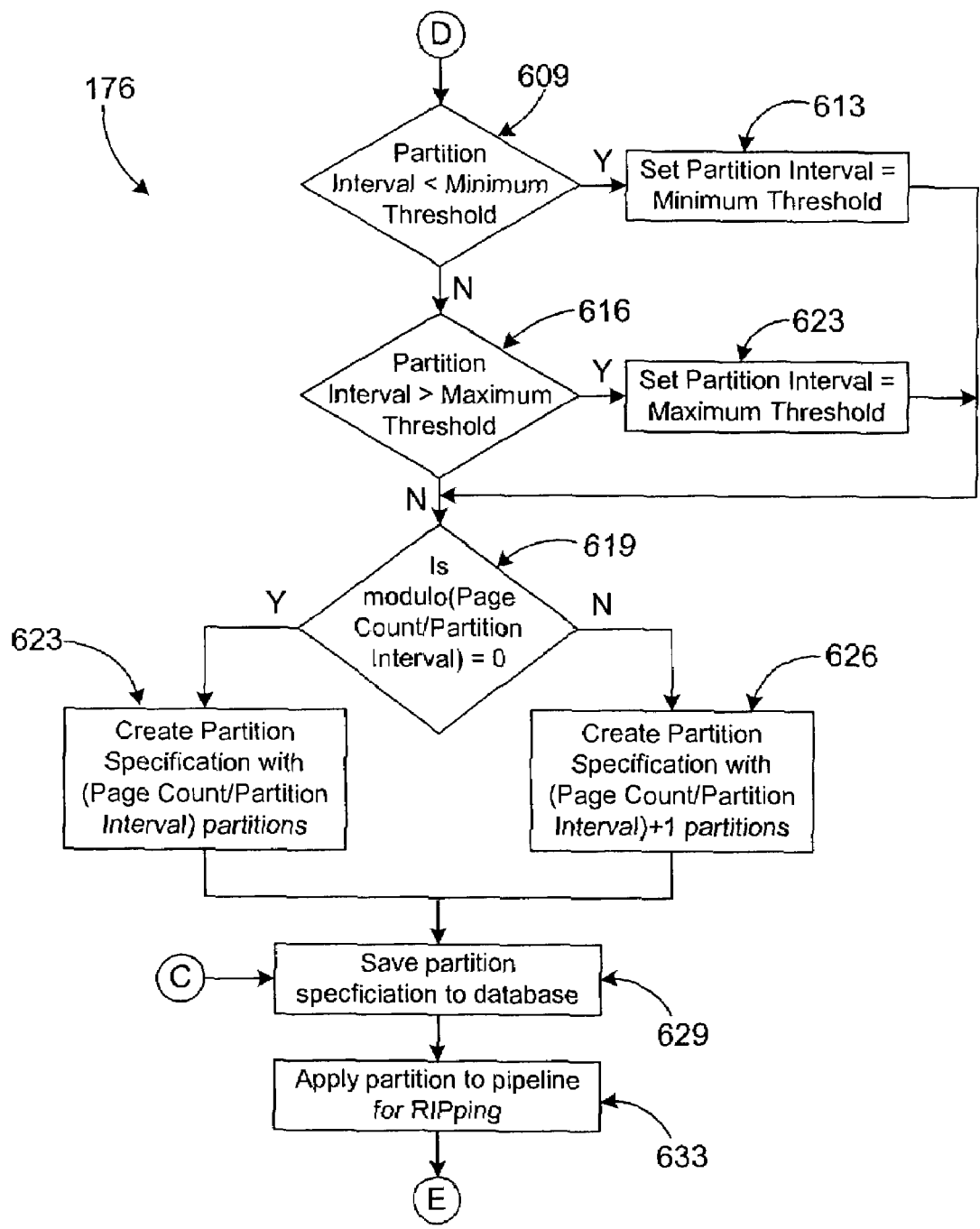

Turning then to FIGS. 15A and 15B, shown is an exemplary flow chart of the partition manager 176 according to an embodiment of the present invention. Alternatively, the flowchart of FIGS. 15A and 15B may be viewed as depicting steps of a method implemented in the computer system 140 (FIG. 2) that determines the number of partitions of the print job 103 (FIG. 1) for raster image processing.

Beginning with box 553, the partition manager 176 determines whether a print job 103 has been assigned to a respective pipeline 113 to be RIPped. If such is the case, then the partition manager 176 proceeds to box 556 in which the number of available RIP engines 109 (FIG. 1) associated with the respective pipeline 113 is determined. The number of available RIP engines 109 is referred to herein as the "RIP count". A RIP engine 109 is available when it is not RIPping a print job 103 and is not subject to an error condition. Once the RIP count is determined, the partition manager 176 proceeds to box 559 in which it is determined whether any of the RIP engines 109 associated with the respective pipeline 113 are currently available such that they can RIP the current print job 103. If none of the RIP engines 109 are available, then the partition manager 176 moves to box 563 in which a predefined delay is executed. Thereafter, the RIP manager 176 reverts back to box 556.

Assuming that at least one RIP engine 109 is available in box 559, then the partition manager 176 proceeds to box 566 in which it is determined whether a page count could be ascertained in box 516 (FIG. 14). If not, then the partition manager 176 moves to box 569 in which a partition of "1" that encompasses the entire print job 103 is designated. Thereafter, the partition manager 176 proceeds to connector C as shown. On the other hand, if the partition manager 176 determines that a page count exists in box 566, then the partition manager 176 proceeds to box 573 in which it is determined whether a user defined partition routine is to be employed to divide the print job 103 into individual partitions for RIPping. If such is the case, then the partition manager 176 proceeds to box 576 in which the user defined partition routine is executed. Thereafter, the partition manager 176 moves to connector D as shown. The user defined partition routine may be created using any one of a number of programming languages or may be configured as a portion of the partition manager, etc.

However, if no user defined partition routine is to be employed as determined in box 573, then the partition manager 176 proceeds to box 579. In box 579, the partition manager 176 determines whether the page count of the current print job 103 is less than the RIP count of the current pipeline 113. If so, then the partition manager 176 proceeds to box 583 in which a partition interval is set equal to the page count. As defined herein, the partition interval is a value that equals the number of pages within a number of equal partitions of the print job 103, excluding any remainder number of pages as will be described. From box 583, the partition manager 176 proceeds to connector D as shown. If the page count is greater than the RIP count as determined in box 576, then the partition manager 176 proceeds to box 586 in which it is determined whether the RIP count is equal to one. If such is the case, then the partition manager 176 proceeds to box 589 were the partition interval is set equal to the page count. From box 589, the partition manager 176 proceeds to connector D as shown.

If the RIP count is not equal to one in box 586, then the partition manager 176 proceeds to box 593 in which it is determined whether the page count is less than a constant $C_1$. The constant $C_1$ may equal, for example, 50 or other appropriate value. If the page count is less than the constant $C_1$ in box 593, then the partition manager 176 proceeds to box 596 in which the partition interval is set equal to the page count/RIP count. Thereafter, the partition manager 176 proceeds to connector D as shown. However, if the page count is greater than the constant $C_1$ in box 593, then the partition manager 176 proceeds to box 599 in which it is determined whether the page count is less then the second constant $C_2$. The second constant $C_2$ may be, for example, 500 or some other value as is appropriate. In this respect, the partitioning may be performed based upon the length of the print job 103. If the page count is less than the constant $C_2$ in box 599, then the partition manager 176 proceeds to box 603 in which the partition interval is set equal to a constant value $C_3$. The constant value $C_3$ may be, for example, 25 or other appropriate value. Thereafter, the partition manager 176 proceeds to connector D.

If however the page count is greater than the second constant $C_2$, then the partition manager 176 proceeds to box 606 in which the partition interval is set equal to the page count/constant $C_4$. The constant $C_4$ may be, for example, 20 or other appropriate value. Thereafter, the partition manager 176 proceeds to connector D. The constants $C_1$-$C_4$ may be preset or user configurable, etc.

Thus, in boxes 579 through 606, the partition manager 176 provides for a set of partitioning criteria that are employed to determine a partition interval that is used to partition the print job 103. As discussed above, the set of partitioning criteria can be based upon a number of the RIP engines that are available to perform the raster image processing of the partitions of the print job. The set of partitioning criteria may also compare the page count with a number of predefined threshold values. There is no limitation on the nature of the partitioning criteria that may be applied.

From connector D, the partition manager 176 proceeds to box 609 to determine whether the partition interval is less then a minimum partition threshold. If the partition interval is less than the minimum partition threshold, then the partition manager 176 proceeds to box 613. Otherwise, the partition manager 176 moves to box 616. In box 613, the partition manager 176 sets the partition interval equal to the minimum threshold value. Thereafter, the partition manager 176 proceeds to box 619 as shown. Assuming that the partition manager 176 has proceeded to box 616, the partition manager 176 determines whether the partition interval is greater than a maximum partition threshold. If such is the case, then the partition manager 176 proceeds to box 623 in which the partition interval is set equal to the maximum partition threshold. Thereafter, the partition manager 176 moves to box 619. The minimum and maximum partition thresholds each may be any appropriate value that is selected based upon design considerations.

In box 619, the partition manager 176 determines whether a remainder partition exists. A remainder partition is a partition that includes a number of pages that is less than the number pages specified in the partition interval. Thus, a remainder partition exists if the partition interval does not evenly divide into the page count. The existence of a partition remainder may be determined by calculating the modulo of the page count divided by the partition interval. If no remainder exists, then the partition manager 176 proceeds to box 623. Otherwise, the partition manager 176 moves to box 626. In box 623, the partition manager 176 creates a partition specification 186 (FIG. 2) for the print job 103 in the database 183 (FIG. 2) that specifies a number of partitions equal to the page count divided by the partition interval. Assuming that the partition manager 176 has proceeded to box 626, then a remainder partition exists. In such case, the partition manager 176 creates a partition specification 186 in the database 183 that specifies a number of partitions equal to the page count divided by the partition interval plus one. From either box 623 or 626, the partition manager 176 proceeds to box 629 in which the newly created partition specification 186 is saved in the database 183. In any event, the partition specification 186 tracks a partition RIP status 189 for each of the partitions. Then, the partition manager 176 applies the print job 103 to a pipeline 113 (FIG. 1) for RIPping. In this regard, the partition manager 176 may place the print job 103 into a queue associated with the respective pipeline 113, etc. Alternatively, the print job 103 may be marked for a specific pipeline 113 and placed in a general queue for all print jobs 103, or some other approach may be employed. Thereafter, the partition manager 176 reverts back to box 553 through connector E as shown. Also, with reference back to box 569, once a single partition is specified for the print job 103, then the partition manager 176 proceeds to box 629 through connector C as shown.

Figure 16:
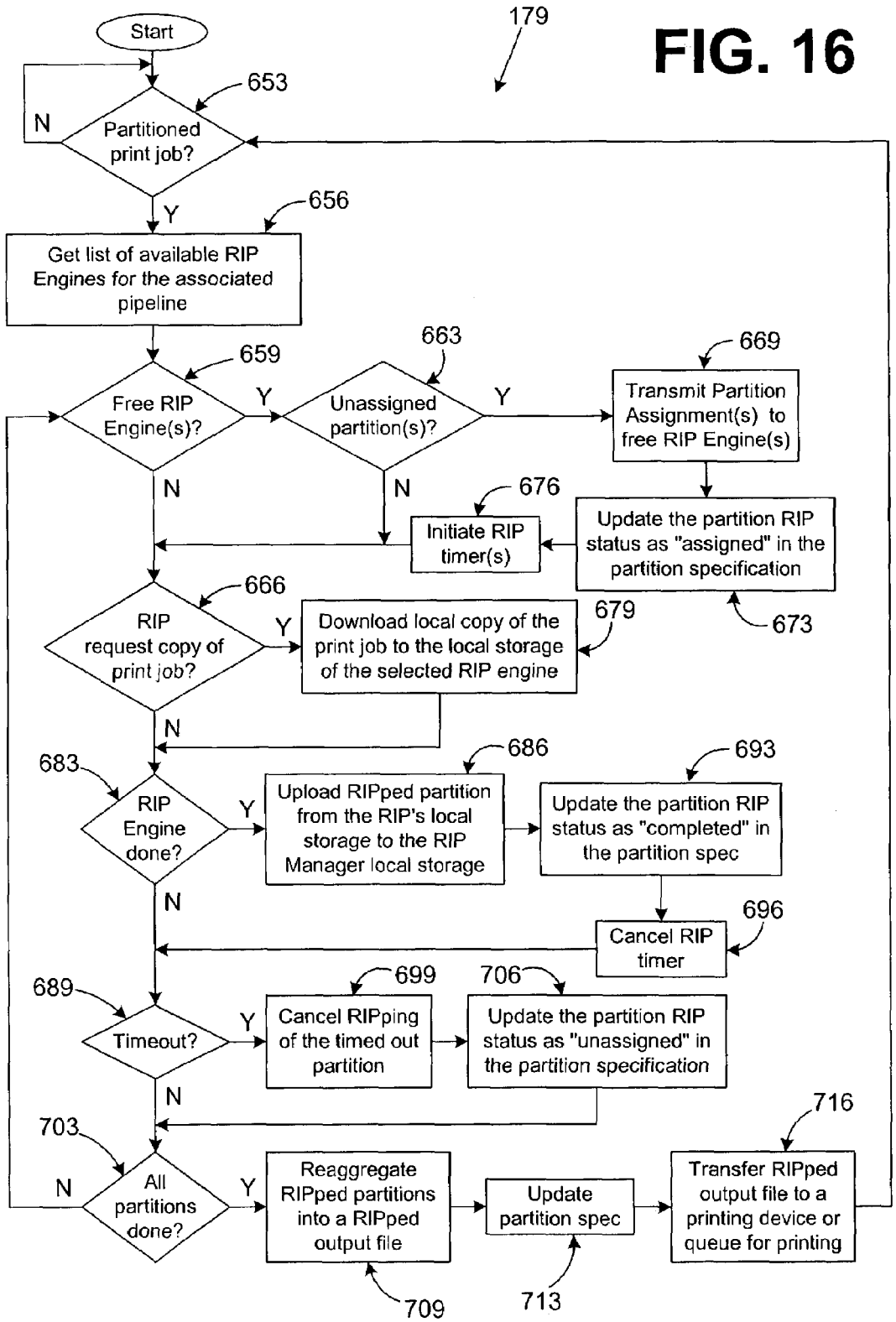
FIG. 16 is an exemplary flow chart of a RIP handler that is executed as a portion of the RIP manager of FIG. 2.

Referring next to FIG. 16, shown is an exemplary flow chart that illustrates the functionality of the RIP handler 179. Alternatively, the flow chart of FIG. 16 may be viewed as depicting steps of a method implemented in the computer system 140 (FIG. 1) to orchestrate the RIPping of a print job 103 (FIG. 1).

Beginning with box 653, the RIP handler 179 waits until a print job 103 is to be partitioned for a respective pipeline 113. Thereafter, in box 656 the RIP handler 179 identifies all available RIP engines 109 (FIG. 1) for the respective pipeline 113. Next, in box 659, if any of the RIP engines 109 associated with the pipeline 113 are available to RIP the current print job 103, then the RIP handler 179 proceeds to box 663. Otherwise, the RIP handler 179 proceeds to box 666. In box 663, the RIP handler 179 determines whether there are any partitions of the present print job 103 that have a partition RIP status 189 of "unassigned".

In this respect, each partition may be "unassigned", "assigned", or "completed". The "unassigned" designation indicates that the respective partition has yet to be assigned to a RIP engine 109 for RIPping. The "assigned" designation indicates that the RIP engine 109 has been assigned to a RIP engine 109 and is currently being RIPped. The "completed" designation indicates that the partition has been successfully RIPped and the RIPped partition 119 (FIG. 1) generated therefrom has been transmitted to the memory 146 that is local to the RIP manager 106 (FIG. 2).

Assuming that there are partitions with a partition RIP status 189 of "unassigned" in box 663, then the RIP handler 179 proceeds to box 669. Otherwise, the RIP handler 179 moves to box 666. In box 669 one or more unassigned partitions are assigned to one or more RIP engines 109, depending upon how many RIP engines 109 associated with the respective pipeline 113 are available for RIPping and depending upon the number of unassigned partitions. To assign a partition to a RIP engine 109, the RIP handler 179 sends the corresponding partition assignment 116 to one of the RIP engines 109. Thereafter, in box 673 the partition RIP status 189 of all newly assigned partitions is updated from "unassigned" to "assigned." Then, in box 676, the RIP handler 179 initiates a timer for each of the newly assigned partitions. The timer enables the RIP handler 179 to determine whether a RIP engine 109 has taken too long to RIP a partition, thereby indicating an error condition or power outage, etc., has occurred. The actual time period tracked by the timer may be configured by the user. The RIP handler 179 then proceeds to box 666.

In box 666 the RIP handler 179 determines whether a copy of the print job 103 has been requested by one of the RIP engines 109. If such is the case, then the RIP handler 179 proceeds to box 679 in which a copy of the print job 103 is downloaded to a memory that is local to the requesting RIP engine 109 such as, for example, the memory 206 (FIG. 3). If no copy of the print job 103 is requested in box 666, or if the copy of the print job 103 is successfully downloaded in box 679, then the RIP handler 179 proceeds to box 683.

In box 683 the RIP handler 179 determines if any one of the RIP engines 109 has completed RIPping an assigned partition. If so, then the RIP handler 179 proceeds to box 686. Otherwise, the RIP handler 179 moves to box 689. In box 686 the corresponding RIPped partition 119 is uploaded from the RIP engine 109 to a memory that is local to the RIP manager 106 such as, for example, the memory 146. Once the RIPped partition 119 has been successfully uploaded, then the RIP handler 179 proceeds to box 693 in which the partition RIP status 189 associated with the respective partition is updated to "completed". The status is not updated to "completed" until after the RIPped partition 119 has been successfully uploaded just in case a power outage or other error occurs during the transmission. Next, in box 696 the timer associated with the completed partition is canceled. Thereafter, the RIP handler 179 proceeds to box 689.

In box 689, the RIP handler 179 determines whether a timeout of one of the timers set in box 676 has occurred, thereby indicating that a problem exists with the RIPping of one of the partitions by the respective RIP engine 109. In this respect, the RIP engine 109 may have experienced a failure or error that interrupted the RIPping process. As such, the RIPping will not have been completed within the allotted time. If a timeout is detected in box 689, then the RIP handler 179 proceeds to box 699. Otherwise, the RIP handler 179 moves to box 703.

In box 699 the RIPping of the assigned partition by the RIP engine 109 is canceled. In this respect, the RIP handler 179 may send a message, for example, to the RIP engine 109 informing it that the RIPping of the assigned partition has been canceled if the RIP engine 109 is responsive. Thereafter, in box 706 the RIP handler 179 updates the respective partition RIP status 189 to "unassigned" in the respective partition specification 186 so that the partition may ultimately be reassigned to a properly functioning RIP engine in box 669. The RIP handler 179 then proceeds to box 703.

In box 703, the RIP handler 179 determines whether all partitions associated with respective print jobs 103 have been RIPped. This may be determined by scanning one or more partition specifications 186 in the database 183 (FIG. 2) to determine if the partition RIP status 189 associated with each of the partitions is "completed". If so, then the RIP handler 179 proceeds to box 709. Otherwise the RIP handler 179 reverts back to box 659.

In box 709, the RIP handler 179 re-aggregates all of the RIPped partitions 119 stored in memory accessible by the RIP manager 106 into a single RIPped output file 123. Then, in box 713 the print job 103 as noted in the corresponding partition specification 186 is indicated as re-aggregated. Thereafter, in box 716 the RIP handler 179 applies the RIPped output file 123 to a print device 126 or a print queue for printing. Alternatively, the RIPped output file 123 may be stored for later printing, etc. Thereafter, the RIP handler 179 reverts back to box 653.

Figure 17:
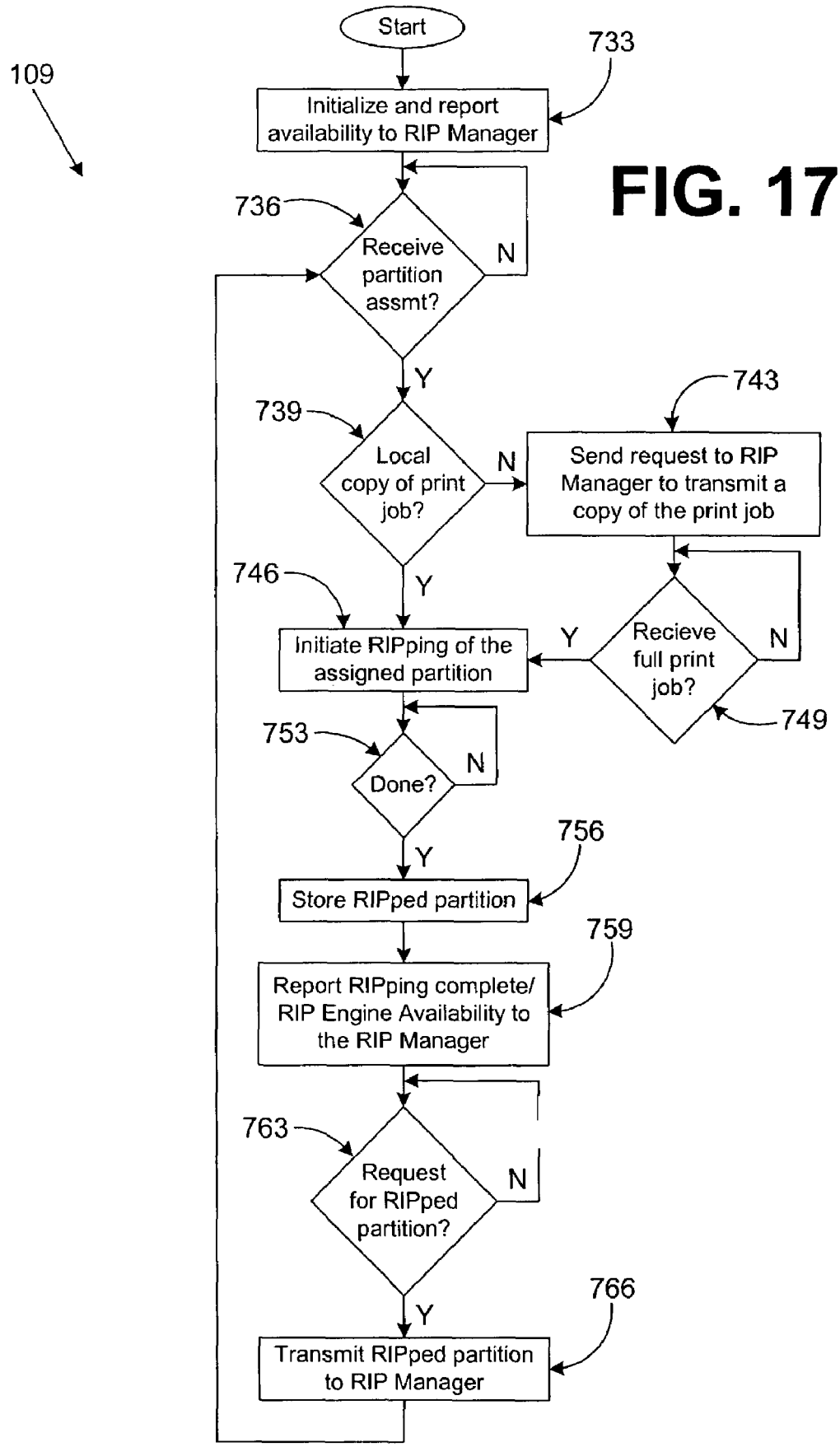
FIG. 17 is an exemplary flow chart of RIP engine logic that is executed by the RIP engine of FIG. 2.

With reference to FIG. 17, shown is an exemplary flow chart of the RIP engine 109 according to an embodiment of the present invention. Alternatively, the flowchart of FIG. 17 may be viewed as depicting steps of a method implemented in the RIP engine system 200 (FIG. 3) to RIP a respective partition of a print job 103 (FIG. 1).

Beginning with box 733, upon startup the RIP engine 109 initializes and reports its availability to the RIP manager 106 (FIG. 2). Thereafter, in box 736, the RIP engine 109 waits to receive a partition assignment 116 from the partition manager 106. Assuming a partition assignment 116 is received, then the RIP engine 109 proceeds to box 739 in which it is determined whether a copy of the print job 103 from which the assigned partition is taken exists in the memory local to the RIP engine 109 such as, for example, the memory 206 (FIG. 3). If not, then the RIP engine 109 proceeds to box 743. Otherwise, the RIP engine 109 moves to box 746.

In box 743, the RIP engine 109 sends a request to the RIP manager 106 to transmit a copy of the print job 103 for use by the RIP engine 109. Then, in box 749, once the RIP engine 109 receives the entire print job 103, the RIP engine 109 proceeds to box 746. In box 746, the RIP engine 109 initiates the RIPping of the assigned partition. In this respect, the RIP engine 109 accesses and RIPs the corresponding portion of the entire print job 103 indicated by the partition assignment 116. Then, in box 753, if the RIP engine 109 completes the RIPping of the assigned partition, the RIP engine 109 proceeds to box 756 in which the RIPped partition 119 is stored in memory that is local to the RIP engine 109 such as, for example, the memory 206. Thereafter, in box 759 the RIP engine 109 reports to the RIP manager 106 that the RIPping of the assigned partition is complete and that the RIP engine 109 is available to RIP further partitions as needed.

Next, in box 763, the RIP engine 109 waits for a request from the RIP manager 106 to upload the RIPped partition 116 to the RIP manager 106. Assuming the request is received, then in box 766, the RIP partition 119 is transmitted to the RIP manager 106. Thereafter, the RIP engine 109 reverts back to box 736. In addition, the RIP engine 109 may report the progress of the RIPping of a partition to the RIP manager 106 during the course of the RIPping operation.

Although the RIP Manager 106 (FIG. 2) and all of the components included therein is embodied in software or code executed by general purpose hardware as discussed above, as an alternative the RIP Manager 106 may also be embodied in dedicated hardware or a combination of software/general purpose hardware and dedicated hardware. If embodied in dedicated hardware, the RIP Manager 106 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The block diagram of FIG. 1 and/or the flow charts of FIGS. 13A, 13B, 14, 15A, 15B, 16, and 17 show the architecture, functionality, and operation of an implementation of the RIP Manager 106 and its various components. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the block diagram and/or flow charts of FIGS. 1, 13A, 13B, 14, 15A, 15B, 16, and 17 show a specific order of execution, it is understood that the order of execution may differ from that which is depicted. For example, the order of execution of two or more blocks may be scrambled relative to the order shown. Also, two or more blocks shown in succession in FIGS. 1, 13A, 13B, 14, 15A, 15B, 16, and 17 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. In addition, various blocks shown in the flow charts of FIGS. 1, 13A, 13B, 14, 15A, 15B, 16, and 17 may represent functionality that is implemented with multiple threads, etc. It is understood that all such variations are within the scope of the present invention.

Also, where the RIP Manager 106 and its various components comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the RIP Manager 106 and its various components for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

We claim:

1. A method for raster image processing, comprising:
   determining a page count for a print job;
   specifying a number of partitions of the print job;
   assigning each of the partitions of the print job to one of a number of raster image processing (RIP) engines for raster image processing;
   maintaining a partition RIP status for each of the partitions after the partitions of the print job have been assigned to a respective one of the RIP engines; and
   re-aggregating a number of raster image processed partitions from the RIP engines into a raster image processed output file, wherein each of the raster image processed partitions is generated by raster image processing a corresponding one of the partitions.

2. The method of claim 1, further comprising transmitting the entire print job to the RIP engines.

3. The method of claim 2, wherein the transmitting of the entire print job to the RIP engines further comprises:
   receiving a request for the print job from one of the RIP engines in a RIP manager; and
   transmitting the print job to the one of the RIP engines in response to the request.

4. The method of claim 1, further comprising transmitting one of the raster image processed partitions from one of the RIP engines to a raster image processing manager after the generation of the one of the raster image processed partitions by one of the RIP engines is complete.

5. The method of claim 1, further comprising determining a number of RIP engines that are available to perform the raster image processing of the partitions of the print job.

6. The method of claim 1, further comprising tracking a time duration of the raster image processing of each of the partitions by respective ones of the RIP engines.

7. The method of claim 6, further comprising canceling the raster image processing of one of the partitions by one of the RIP engines if the time duration exceeds a predefined timeout period.

8. The method of claim 1, wherein the specifying the number of partitions of the print job further comprises specifying a number of consecutive pages of the print job for each one of the partitions.

9. The method of claim 1, further comprising determining whether the page count can be ascertained from the print job.

10. The method of claim 9, further comprising applying the print job to one of the RIP engines for raster image processing if the page count cannot be ascertained from the print job.

11. The method of claim 1, wherein the specifying of the number of partitions of the print job further comprises applying a set of partitioning criteria to the print job to determine a partition interval.

12. The method of claim 11, further comprising providing the set of partitioning criteria that are based upon a number of the RIP engines that are available to perform the raster image processing of the partitions of the print job.

13. The method of claim 11, further comprising providing the set of partitioning criteria that compares the page count with a number of predefined threshold values.

14. The method of claim 11, further comprising specifying a remainder one of the partitions where modulo((page count)/(partition interval))≠0.

15. A system for raster image processing, comprising:
    a processor circuit having a processor and a memory;
    a raster image processing (RIP) manager stored in the memory and executable by the processor, the RIP manager further comprising:
    logic that determines a page count for a print job;
    logic that specifies a number of partitions of the print job;
    logic that assigns each of the partitions of the print job to one of a number of raster image processing (RIP) engines for raster image processing;
    logic that maintains a partition RIP status for each of the partitions after the partitions of the print job have been assigned to a respective one of the RIP engines; and
    logic that re-aggregates a number of raster image processed partitions from the RIP engines into a raster image processed output file, wherein each of the raster image processed partitions is generated by raster image processing a corresponding one of the partitions.

16. The system of claim 15, wherein the RIP manager further comprises logic that transmits the entire print job to the RIP engines.

17. The system of claim 16, wherein the logic that transmits the entire print job to the RIP engines further comprises logic that transmits the print job to one of the RIP engines in response to a request for the print job received from the one of the RIP engines.

18. The system of claim 15, wherein the RIP manager further comprises logic that transmits a request for a raster image processed partition from one of the RIP engines upon receiving a message from the one of the RIP engines that the raster image processing of a partition assigned to the one of the RIP engines is complete.

19. The system of claim 15, wherein the RIP manager further comprises logic that determines a number of RIP engines that are available to perform the raster image processing of the partitions of the print job.

20. The system of claim 15, wherein the RIP manager further comprises logic that tracks a time duration of the raster image processing of each of the partitions by respective ones of the RIP engines.

21. The system of claim 20, wherein the RIP manager further comprises logic that cancels the raster image processing of one of the partitions by one of the RIP engines if the time duration exceeds a predefined timeout period.

22. The system of claim 15, wherein the logic that specifies the number of partitions of the print job further comprises logic that specifies a number of consecutive pages of the print job for each one of the partitions.

23. The system of claim 15, further comprising logic that determines whether the page count can be ascertained from the print job.

24. The system of claim 23, further comprising logic that applies the print job to one of the RIP engines for raster image processing if the page count cannot be ascertained from the print job.

25. The system of claim 15, wherein the logic that specifies the number of partitions of the print job further comprises logic that applies a set of partitioning criteria to the print job to determine a partition interval.

26. The system of claim 25, wherein the set of partitioning criteria are based in part upon an available number of the RIP engines to perform the raster image processing of the partitions of the print job.

27. The system of claim 25, wherein the set of partitioning criteria further comprise a comparison of the page count with a number of predefined threshold values.

28. The system of claim 25, wherein the logic that specifies the number of partitions of the print job further comprises logic that specifies a remainder one of the partitions where modulo((page count)/(partition interval))≠0.

29. A computer readable medium embodying computer executable instructions, comprising:
  code that determines a page count for a print job;
  code that specifies a number of partitions of the print job;
  code that assigns each of the partitions of the print job to one of a number of raster image processing (RIP) engines for raster image processing;
  code that maintains a partition RIP status for each of the partitions after the partitions of the print job have been assigned to a respective one of the RIP engines; and
  code that re-aggregates a number of raster image processed partitions from the RIP engines into a raster image processed output file, wherein each of the raster image processed partitions is generated by raster image processing a corresponding one of the partitions.

30. The computer readable medium of claim 29, further comprising code that transmits the entire print job to the RIP engines.

31. The computer readable medium of claim 29, further comprising code that determines a number of RIP engines that are available to perform the raster image processing of the partitions of the print job.

32. The computer readable medium of claim 29, further comprising code that tracks a time duration of the raster image processing of each of the partitions by respective ones of the RIP engines.

33. The computer readable medium of claim 32, further comprising code that cancels the raster image processing of one of the partitions by one of the RIP engines if the time duration exceeds a predefined timeout period.

34. The computer readable medium of claim 29, further comprising code that determines whether the page count can be ascertained from the print job.

35. The computer readable medium of claim 34, further comprising code that applies the print job to one of the RIP engines for raster image processing if the page count cannot be ascertained from the print job.

36. The computer readable medium of claim 29, wherein the code that specifies the number of partitions of the print job further comprises code that applies a set of partitioning criteria to the print job to determine a partition interval.

37. A system for raster image processing, comprising:
  means for determining a page count for a print job;
  means for specifying a number of partitions of the print job;
  means for assigning each of the partitions of the print job to one of a number of raster image processing (RIP) engines for raster image processing;
  means for maintaining a partition RIP status for each of the partitions after the partitions of the print job have been assigned to a respective one of the RIP engines; and
  means for re-aggregating a number of raster image processed partitions from the RIP engines into a raster image processed output file, wherein each of the raster image processed partitions is generated by raster image processing a corresponding one of the partitions.

38. The system of claim 37, further comprising means for determining a number of RIP engines that are available to perform the raster image processing of the partitions of the print job.

39. The system of claim 37, further comprising means for determining whether the page count can be ascertained from the print job.

40. The system of claim 39, further comprising means for applying the print job to one of the RIP engines for raster image processing if the page count cannot be ascertained from the print job.

* * * * *